(12) United States Patent  (10) Patent No.: US 7,826,686 B2
Miyashita et al.  (45) Date of Patent: Nov. 2, 2010

(54) PIXEL INTERPOLATION APPARATUS AND PIXEL INTERPOLATION PROGRAM PRODUCT

(75) Inventors: Takeshi Miyashita, Nagano (JP); Hironori Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 984 days.

(21) Appl. No.: 11/378,451

(22) Filed: Mar. 20, 2006

(65) Prior Publication Data

US 2006/0222268 A1   Oct. 5, 2006

(30) Foreign Application Priority Data

Mar. 18, 2005 (JP) ............................ P2005-079560
Mar. 18, 2005 (JP) ............................ P2005-079561

(51) Int. Cl.
*G06K 9/32* (2006.01)
*G06K 15/02* (2006.01)
*H04N 5/262* (2006.01)
*H04N 1/393* (2006.01)
*H04N 1/46* (2006.01)

(52) U.S. Cl. ............... 382/300; 348/240.2; 358/1.2; 358/451; 358/525

(58) Field of Classification Search ............ 382/279, 382/293, 298–301; 348/222.1, 240.99, 240.1, 348/240.2; 358/1.2, 443, 451, 525
See application file for complete search history.

(56) References Cited

U.S. PATENT DOCUMENTS 6,263,120 B1 * 7/2001 Matsuoka .................... 382/300

FOREIGN PATENT DOCUMENTS

| CA | 2 260 339 A1 | 8/1999 |
|---|---|---|
| EP | 1 067 774 A2 | 1/2001 |
| JP | 07-050752 A | 2/1995 |
| JP | 11298727 A | 10/1999 |
| JP | 2000-076432 A | 3/2000 |
| JP | 3045134 B2 | 3/2000 |
| JP | 2000-115526 A | 4/2000 |
| JP | 2000-137807 A | 5/2000 |
| JP | 2000-253235 A | 9/2000 |
| JP | 2001-08037 A | 1/2001 |
| JP | 2002-209096 A | 7/2002 |
| JP | 2003-008884 A | 1/2003 |

* cited by examiner

*Primary Examiner*—Vu Le
*Assistant Examiner*—Nathan Bloom
(74) *Attorney, Agent, or Firm*—Sughrue Mion, PLLC

(57) ABSTRACT

To generate the pixel value of one interpolation point from the pixel values of the four original pixels in the surroundings of the interpolation point, when the pixel values of the four involve a predetermined density difference, a printer uses the corrected inverse distance value in place of the inverse distance value found according to general bilinear interpolation.

8 Claims, 16 Drawing Sheets

(a)  (b)

PIXEL INTERPOLATION APPARATUS AND PIXEL INTERPOLATION PROGRAM PRODUCT

BACKGROUND OF THE INVENTION

1. Technical Field of the Invention

This invention relates to a pixel interpolation apparatus for interpolating pixels between pixels of an image for enhancing the resolution of the image and a pixel interpolation program product for causing a computer to operate as the pixel interpolation apparatus.

2. Description of the Related Art

As known, to enlarge an image by enhancing the resolution of the image, several new pixels need to be interpolated between the original pixels of the original image. To interpolate new pixels between the original pixels, a method of copying the pixel value of the original pixel in the coordinates nearest to the new pixel and adopting the pixel value as the pixel value of the new pixel is available, but the image whose resolution is enhance according to the method becomes like a mosaic as the image is seen on an enlarged scale through a magnifying glass. Then, to make the enlarged image a smooth image, usually a method of mathematically estimating the pixel value in coordinates (interpolation point) defined as those of new pixel in a gap of the original pixels of the original image from the pixel values of the several original pixels in the surroundings of the interpolation point is adopted.

Bicubic interpolation and bilinear interpolation are well known as the method of mathematically estimating the pixel value at the interpolation point. Either interpolation basically is a method of weighting each of the pixel values of the several original pixels placed in the surroundings of one interpolation point in response to the distance from each of the original pixels to the interpolation point and adopting the sum total of the weighted pixel values as the pixel value of the interpolation point.

Specifically, the bicubic interpolation is as follows: Operation of assigning a distance value to a cubic polynomial variable z with quartic and later terms ignored in a Taylor expansion expression of an interpolation function $(\sin \pi z)/\pi z$, thereby calculating the weight to the pixel value of the original pixel is performed in the longitudinal direction and the lateral direction and the value provided by multiplying the weight in the longitudinal direction by the weight in the lateral direction is adopted as the final weight by which the pixel value of the original pixel is multiplied. In the bicubic interpolation, the pixels to be thus weighted are 16 original pixels in the surroundings of the interpolation point and cubic operation of longitudinal component and cubic operation of lateral component are performed on each of the 16 original pixels. Thus, according to the bicubic interpolation, the interpolation precision is high and a smooth image can be provided although it takes much time in performing the operations.

On the other hand, the bilinear interpolation is as follows: Operation of standardizing the longitudinal and lateral distances of a rectangle area in which an interpolation point is surrounded by four original pixels to one and calculating the inverse distance from the original pixel to the interpolation point (distance between the original pixel existing on the diagonal side of the original pixel and the interpolation point) is performed in the longitudinal direction and the lateral direction and the value provided by multiplying the weight in the longitudinal direction by the weight in the lateral direction is adopted as the final weight by which the pixel value of the original pixel is multiplied. This means that the bilinear interpolation is a method of calculating the inverse distance weighted average at the interpolation point relative to the pixel values of the four original pixels surrounding the interpolation point. As described above, in the bilinear interpolation, the pixels to be weighted are four original pixels in the surroundings of the interpolation point, and linear operation of longitudinal component and linear operation of lateral component are performed on each of the four original pixels. Thus, according to the linear interpolation, the operations can be completed comparatively rapidly although the interpolation precision is not so high (for example, see Japanese Patent No. 3045134)

To interpolate new pixels between original pixels, no original pixel may be placed at a position adjacent to the boundary (margin) of an enlarged image depending on how the coordinates of an interpolation point in the original image are taken. In this case, several interpolation points exist between the original pixel and, the boundary. If an attempt is made to calculate the pixel value of each of the interpolation points using the above-described bilinear interpolation, the pixel value cannot be calculated because four original pixels are not complete in the surroundings of the interpolation point. Then, for the interpolation point adjacent between the original pixel and the boundary, assuming that an original pixel having the same pixel value as the surrounding original pixel exists outside the boundary, an inverse distance weighted average at the interpolation point relative to the pixel values of four original pixels is calculated. Such processing is called boundary value processing.

By the way, an image with moderate change in light and shade like a landscape may be selected as the object whose resolution is to be enhanced; an image with sharp change in light and shade like a geometric pattern such as a check pattern or a solid image like a cartoon may be selected.

If the image with sharp change in light and shade is enlarged using the bilinear interpolation described above, the boundary portion (edge) where light and shade change sharply in the post-enlarged image becomes dim; this is a problem.

For example, if an image of a check pattern as shown in FIG. 16(a) is enlarged using the bilinear interpolation, the post-enlarged image becomes an image where the boundary between white and black squares is extremely unclear as shown in FIG. 16(b). FIG. 17 is a graph to show a pixel value distribution on a line D of the enlarged image shown in FIG. 16 (b). As shown in FIG. 17, the pixel values of the pixels on the boundary between white and black squares and in the proximity of the boundary in the enlarge image provided using the bilinear interpolation distribute linearly. It is also clear from the graph that the boundary between white and black squares is dim.

By the way, to enlarge an image in an information processing apparatus having an insufficient memory capacity like a printer, it may be impossible to perform pixel interpolation processing for the image data of an original image at a time. In this case, the information processing apparatus may divide the image data of the original image into several pieces and may perform the pixel interpolation processing for the divided image data pieces in order.

However, if the pixel interpolation processing is performed separately for the divided image data pieces, when images based on the image data pieces after subjected to the processing are joined as one enlarged image, an image joint may appear in the enlarged image.

For example, if an image made up of lateral and vertical stripes as shown in FIG. 18A is divided into two parts along a line E-E and the divided images are separately enlarged according to the bilinear interpolation and then are joined, the boundary between the white and black stripes on the line E-E in the vertical-striped pattern in the post-joined enlarged image has light and shade change different from light and shade change in any other boundary and joints are conspicuous as shown in FIG. 18B. The phenomenon in which the joints appear occurs if the image is divided in the boundary between the white and black stripes in the vertical-striped pattern and the above-described boundary value processing is performed at the interpolation point adjacent to the division line. Therefore, the phenomenon can occur in not only the check pattern as shown in FIG. 18A, but also a check pattern as shown in FIG. 21, for example.

SUMMARY OF THE INVENTION

It is therefore a first object of the invention to prevent as much as possible the boundary portion where light and shade change in the post-enlarged image from becoming dim even if an image with sharp change in light and shade is enlarged using bilinear interpolation.

It is therefore a second object of the invention to make an image joint inconspicuous as much as possible in the final enlarged image even if an image with sharp change in light and shade is divided in the light and shade boundary portion and the divided images are enlarged using bilinear interpolation and then are joined.

To solve at least one of the objects, according to an embodiment of the invention, there is provided a pixel interpolation apparatus including an image data acquisition section for acquiring image data of an original image made up of a large number of pixels arranged two-dimensionally as a process target; a magnification acquisition section for acquiring a magnification of the original image of the image data acquired by the image data acquisition section; an interpolation point definition section for defining an interpolation point between the original pixels of the original image in response to the magnification acquired by the magnification acquisition section; an inverse distance value generation section for performing processing of calculating the value of the inverse distance in the longitudinal direction and the value of the inverse distance in the lateral direction from four original pixels to an interpolation point based on the distance in the longitudinal direction and the distance in the lateral direction of a rectangular area defined by the four original pixels in the surroundings of the interpolation point for each of all interpolation points defined by the interpolation point definition section; an inverse distance value correction section for reading the correction inverse distance value corresponding to the inverse distance value calculated by the inverse distance value generation section for the interpolation point where the pixel values of the four original pixels in the surroundings of the interpolation point involve a predetermined density difference, of all interpolation points defined by the interpolation point definition section from storage for storing inverse distance values and correction inverse distance values in association with each other and replacing the inverse distance value with the correction inverse distance value; a pixel value generation section for performing processing of calculating an inverse distance weighted average of the interpolation point based on the inverse distance value calculated by the inverse distance value generation section for the interpolation point or the correction inverse distance value provided by the inverse distance value correction section and the pixel values of the four original pixels in the surroundings of the interpolation point for each of all interpolation points defined by the interpolation point definition section; and an image data output section for outputting image data made up of pixel values generated relative to each interpolation point by the pixel value generation section as image data of an enlarged image.

Thus, to generate a pixel value for one interpolation point, when the pixel values of the four original pixels in the surroundings of the interpolation point involve a predetermined density difference, if the corrected inverse distance value is used in place of the inverse distance value found according to general bilinear interpolation, the boundary portion where light and shade change in the post-enlarged image is more enhanced. This means that the degree of dimness appearing in the boundary portion is lessened.

According to another embodiment of the invention, there is provided a pixel interpolation program product for causing a computer to function as image data acquisition means for acquiring image data of an original image made up of a large number of pixels arranged two-dimensionally as a process target; magnification acquisition means for acquiring a magnification of the original image of the image data acquired by the image data acquisition means; interpolation point definition means for defining an interpolation point between the original pixels of the original image in response to the magnification acquired by the magnification acquisition means; inverse distance value generation means for performing processing of calculating the value of the inverse distance in the longitudinal direction and the value of the inverse distance in the lateral direction from four original pixels to an interpolation point based on the distance in the longitudinal direction and the distance in the lateral direction of a rectangular area defined by the four original pixels in the surroundings of the interpolation point for each of all interpolation points defined by the interpolation point definition means; inverse distance value correction means for reading the correction inverse distance value corresponding to the inverse distance value calculated by the inverse distance value generation means for the interpolation point where the pixel values of the four original pixels in the surroundings of the interpolation point involve a predetermined density difference, of all interpolation points defined by the interpolation point definition means from storage for storing inverse distance values and correction inverse distance values in association with each other and replacing the inverse distance value with the correction inverse distance value; pixel value generation means for performing processing of calculating an inverse distance weighted average of the interpolation point based on the inverse distance value calculated by the inverse distance value generation means for the interpolation point or the correction inverse distance value provided by the inverse distance value correction means and the pixel values of the four original pixels in the surroundings of the interpolation point for each of all interpolation points defined by the interpolation point definition means; and image data output means for outputting image data made up of pixel values generated relative to each interpolation point by the pixel value generation means as image data of an enlarged image.

Therefore, the pixel interpolation program product can cause a computer to operate as an apparatus which functions equivalent to the pixel interpolation apparatus according to the embodiment described above.

Thus, according to embodiments of the invention, even if an image with sharp change in light and shade is enlarged using the bilinear interpolation, the degree of dimness appearing in the boundary portion where light and shade change in the post-enlarged image is decreased.

To solve at least one of the objects, according to an embodiment of the invention, there is provided a pixel interpolation apparatus including an image data acquisition section for acquiring image data of an original image made up of a large number of pixels arranged two-dimensionally as a process target; a magnification acquisition section for acquiring a magnification of the original image of the image data acquired by the image data acquisition section; an interpolation point definition section for defining an interpolation point between the original pixels of the original image in response to the magnification acquired by the magnification acquisition section; an inverse distance value generation section for performing processing of calculating the value of the inverse distance in the longitudinal direction and the value of the inverse distance in the lateral direction from four original pixels to an interpolation point based on the distance in the longitudinal direction and the distance in the lateral direction of a rectangular area defined by the four original pixels in the surroundings of the interpolation point for each of all interpolation points defined by the interpolation point definition section; an inverse distance value correction section for reading the correction inverse distance value corresponding to the inverse distance value calculated by the inverse distance value generation section for the interpolation point outside the area occupied by the original pixels of the original image and with the pixel values of the four original pixels in the surroundings of the interpolation point involving a predetermined density difference, of all interpolation points defined by the interpolation point definition section from storage for storing inverse distance values and correction inverse distance values in association with each other and replacing the inverse distance value with the correction inverse distance value; a pixel value generation section for performing processing of calculating an inverse distance weighted average of the interpolation point based on the inverse distance value calculated by the inverse distance value generation section for the interpolation point or the correction inverse distance value provided by the inverse distance value correction section and the pixel values of the four original pixels in the surroundings of the interpolation point for each of all interpolation points defined by the interpolation point definition section; and an image data output section for outputting image data made up of pixel values generated relative to each interpolation point by the pixel value generation section as image data of an enlarged image.

Thus, to generate a pixel value for one interpolation point, when the interpolation point is outside the area occupied by the original pixels of the original image and the pixel values of the four original pixels in the surroundings of the interpolation point involves a predetermined density difference, if the corrected inverse distance value is used in place of the inverse distance value found according to general bilinear interpolation, change in light and shade in the overlap portion of the boundary where light and shade change in the post-enlarged image and the image division line is moderated and the image joint in the final enlarged image becomes inconspicuous According to another embodiment of the invention, there is provided a pixel interpolation program product for causing a computer to function as image data acquisition means for acquiring image data of an original image made up of a large number of pixels arranged two-dimensionally as a process target; magnification acquisition means for acquiring a magnification of the original image of the image data acquired by the image data acquisition means; interpolation point definition means for defining an interpolation point between the original pixels of the original image in response to, the magnification acquired by the magnification acquisition means; inverse distance value generation means for performing processing of calculating the value of the inverse distance in the longitudinal direction and the value of the inverse distance in the lateral direction from four original pixels to an interpolation point based on the distance in the longitudinal direction and the distance in the lateral direction of a rectangular area defined by the four original pixels in the surroundings of the interpolation point for each of all interpolation points defined by the interpolation point definition means; inverse distance value correction means for reading the correction inverse distance value corresponding to the inverse distance value calculated by the inverse distance value generation means for the interpolation point outside the area occupied by the original pixels of the original image and with the pixel values of the four original pixels in the surroundings of the interpolation point involving a predetermined density difference, of all interpolation points defined by the interpolation point definition means from storage for storing inverse distance values and correction inverse distance values in association with each other and replacing the inverse distance value with the correction inverse distance value; pixel value generation means for performing processing of calculating an inverse distance weighted average of the interpolation point based on the inverse distance value calculated by the inverse distance value generation means for the interpolation point or the correction inverse distance value provided by the inverse distance value correction means and the pixel values of the four original pixels in the surroundings of the interpolation point for each of all interpolation points defined by the interpolation point definition means; and image data output means for outputting image data made up of pixel values generated relative to each interpolation point by the pixel value generation means as image data of an enlarged image.

Therefore, the pixel interpolation program product can cause a computer to operate as an apparatus which functions equivalent to the pixel interpolation apparatus according to the embodiments described above.

Thus, according to the embodiments of invention, even if an image containing a picture with sharp change in light and shade is divided in the light and shade boundary portion and the divided images are enlarged using the bilinear interpolation and then are joined, the image joint becomes inconspicuous in the final enlarged image.

DETAILED DESCRIPTION OF THE INVENTION

A printer of one embodiment for carrying out the invention will be discussed with reference to the accompanying drawings.

Figure 1:
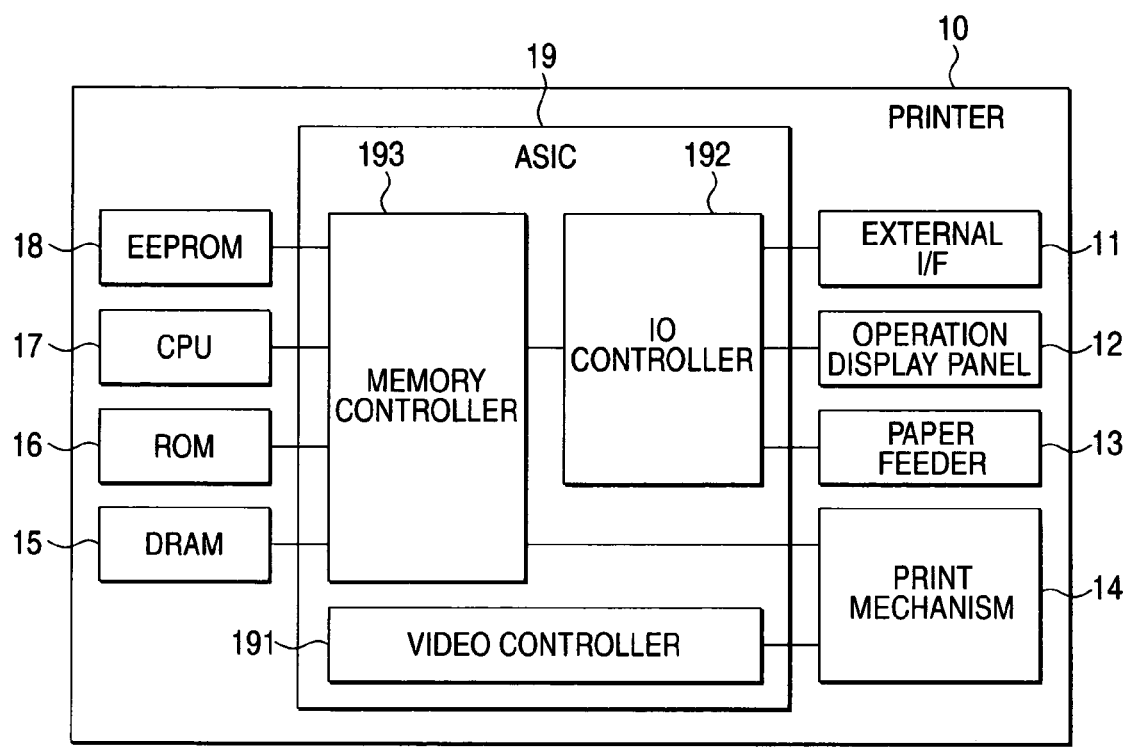
FIG. 1 is a block diagram of a printer of an embodiment of the invention.

FIG. 1 is a block diagram of a printer 10 of the embodiment. The printer 10 is an apparatus for printing upon reception of a print request from a host computer (not shown) or image data from an external machine (not shown).

The external machines (not shown) include a camera and a scanner. The camera is an apparatus with a USB port capable of acquiring image data of a still image; specifically it is a digital still camera, a digital video camera, a mobile telephone with a camera, etc. The scanner is an apparatus for reading an image from an original placed on an original bed and converting the image into image data. When the printer 10 is connected to the scanner (not shown), it functions as a printing unit in a copier or a multiple function processing machine.

The printer 10 incorporates an external I/F 11, an operation display panel 12, a paper feeder 13, a print mechanism 14, DRAM 15, ROM 16, a CPU 17, EEPROM 18, and an ASIC 19, as main components.

The external I/F 11 is a communication interface port for receiving a print request from the host computer (not shown) or receiving image data from the external machine (not shown). Specifically, the external I/F 11 is a parallel port for conducting communications conforming to the IEEE 1284 standard, a parallel port of Centronics specifications, a LAN board of Ethernet (US Xerox Corporation, US Intel Corporation, US Compaq Computers Corporation trademark) specifications, a serial port for conducting communications conforming to the IEEE 1394 standard, a USB port for conducting communications conforming to the USB standard, etc.

The operation display panel 12 is a machine for accepting various commands from the user and displaying various screens and includes pushbuttons and a touch screen.

The paper feeder 13 is a mechanism for supplying one or more types of paper to the print mechanism 14 and includes several slots each in which a paper cassette is detachably placed. The print mechanism 14 is a mechanism for actually printing on paper supplied from the paper feeder 13.

The DRAM [Dynamic Random Access Memory] 15 is nonvolatile memory used as a temporary storage area of a print request from the host computer (not shown) or image data from the external machine (not shown) and as a work area when various types of processing are performed for the image data.

The ROM [Read-Only Memory] 16 is nonvolatile memory storing a control program of the printer 10 and font data used to generate image data based on print data in a print request.

The CPU [Central Processing Unit] 17 is a control circuit for comprehensively controlling the sections of the printer 10 in accordance with the program in the ROM 16. Specifically, the CPU 17 performs processing of acquiring a command of processing to be executed from the user as the user operates a button or the touch screen of the operation display panel 12 provided on the top of the printer 10, processing of generating the image data to be transferred to the print mechanism 14 based on a print request from the host computer (not shown) or image data from the external machine (not shown), and print control processing of controlling the print mechanism 14 so as to print an image based on the image data.

The EEPROM [Electrically Erasable And Programmable Read-Only Memory] 18 is flash memory for retaining various settings involved in print still after the power is turned off.

The ASIC [Application-Specific Integrated Circuit] 19 is a semiconductor integrated circuit for controlling transfer of data and commands among the hardware components 11 to 18 and are connected to the hardware components 11 to 18. The ASIC 19 includes a video controller 191, an IO controller 192, and a memory controller 193 as interfaces with the hardware components 11 to 18.

The video controller 191 is a circuit module for converting the image data to be supplied to the print mechanism 14 into an electric signal in a format that can be processed by a scanning unit (not shown) in the print mechanism 14.

The IO controller 192 is a circuit module for controlling the external I/F 11, the operation display panel 12, and the paper feeder 13. The IO controller 192 also serves as a circuit module for performing processing of transferring a print request from the host computer (not shown) or image data from the external machine (not shown) from the external I/F 11 directly to the DRAM 15.

The memory controller 193 is a circuit module having a function of controlling read/write of a program and data from/into the DRAM 15, a function of controlling read of a program and data from the ROM 16, and a function of controlling a controller (not shown) in the print mechanism 14.

In the printer 10 of the embodiment made up of the hardware devices as described above, the storage capacity of the DRAM 15 is not sufficient and therefore the processing description is constructed appropriately so as to be able to cover the processing in the storage capacity. Specifically, when a print request containing print data created in a page description language is sent from the host computer (not shown), processing of generating a part of the image data and then outputting it to the video controller 191 rather than generating one-page image data and then outputting it to the video controller 191 is performed in order for parts of the image data.

Likewise, when a print request containing print data is sent from the host computer (not shown), processing of receiving a part of the image data and outputting it to the video controller 191 is performed in order for parts of the image data. Similarity is also applied when image data is sent from the external machine (not shown).

The processing of generating the image data from a print request and the processing of inputting the image data sent from the host computer (not shown) or the external machine (not shown) into the DRAM 15 correspond to the above-described image data acquisition means. The CPU 17, the external I/F 11, and the IO controller 121 for executing the processing correspond to the above-described image data acquisition section.

Figure 2:
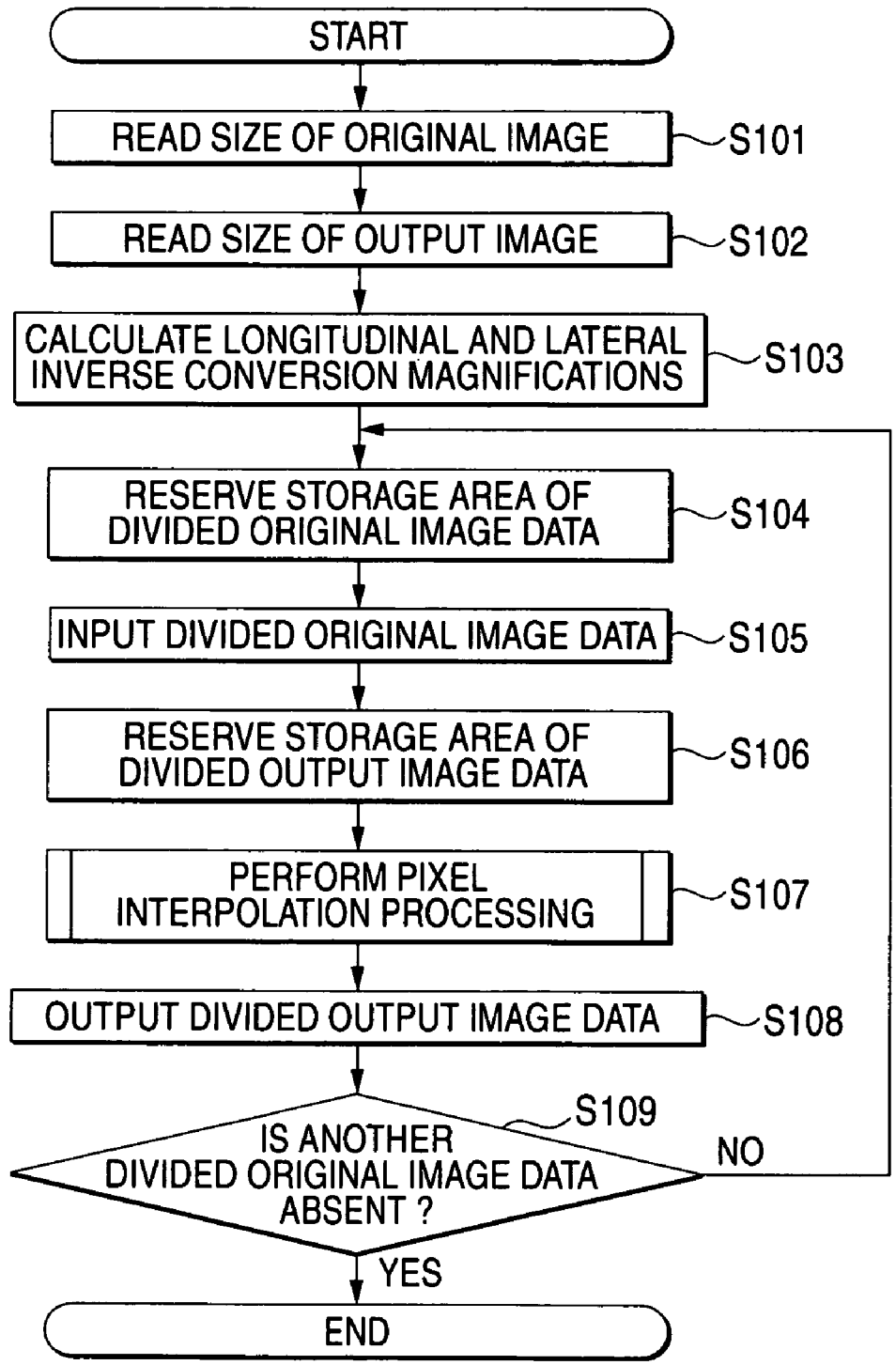
FIG. 2 is a flowchart to show a flow of processing of enhancing the resolution of an image based on image data.

By the way, the image based on the image data in a print request from the host computer (not shown) or the image based on the image data from the external machine (not shown) may have too low resolution and may be unsuited for output to the video controller 191. In this case, the CPU 17 reads a predetermined program from the ROM 16 and performs processing of enhancing the resolution of the image based on the image data. FIG. 2 is a flowchart to show a flow of the processing.

After the processing starts, the CPU 17 acquires information indicating the size (here, the horizontal number of pixels is defined as Ih and the vertical number of pixels is defined as Iv) of the image whose resolution is to be enhanced (which will be hereinafter referred to as the original image) from the header of the image data of the original image (S101).

Subsequently, the CPU 17 acquires information indicating the size (here, the horizontal number of pixels is defined as Oh and the vertical number of pixels is defined as Ov) of the image set as the optimum output to the video controller 191 from the EEPROM 18, etc., (S102).

Then, the CPU 17 calculates longitudinal and lateral magnifications based on the acquired size information and calculates inverse conversion magnifications based on the calculated magnifications (S103).

The inverse conversion magnifications will be discussed. Here, the coordinates of each pixel of the original image are represented as (x, y) and the coordinates of each pixel of the post-enlarged output image are represented as (X, Y). The X, Y coordinate values of the output image take each an integer with the minimum unit as 1 (this means that the distance between the adjacent pixels is 1).

To enlarge the original image, usually the X coordinate value and the Y coordinate value of each pixel of the output image are multiplied by the reciprocals of the magnifications (Oh/Ih and Ov/Iv), whereby the corresponding x coordinate value and the corresponding y coordinate value in the original image are calculated. If the x coordinate value and the y coordinate value are both integers, the pixel value of the coordinates (x, y) in the original image is determined to be the pixel value of the coordinates (X, Y) of the output image; if either or both of the x coordinate value and the y coordinate value are decimal fractions, the pixel value of the coordinates (x, y) is estimated as described later with the coordinates (x, y) as an interpolation point and the estimated pixel value is determined to be the pixel value of the coordinates (X, Y) of the output image.

However, if the minimum unit of the X, Y coordinate value of the output image is 1, the x, y coordinate value may become a decimal fraction with a small value to the left of the decimal point. Then, when weight is calculated according to the bilinear interpolation based on the x, y coordinate value, load is imposed on the processing. Thus, in the embodiment, the number provided by multiplying the reciprocal of the magnification described above by a numeric value of 256 is defined as the inverse conversion magnification.

The numeric value 256 substantially functions as representation of the length between the adjacent pixels in the original image as 256 rather than 1. If the length of one section in the original image is thus represented as 256, when the magnification is 16 or less, the value to the left of the decimal point in the coordinate values of the coordinates (x, y) of the original image corresponding to the coordinates (X, Y) of the output image can be increased and the value to the right of the decimal point can be discarded for performing operation. However, if the x, y coordinate values in the original image are represented as a cumulative value of 256, the x, y coordinate values become extremely large. Thus, in the following processing, whenever the x, y coordinate value reaches 256, the value is reset to 0, so that the value of 256 is limitatively used as representation of only the length of one section between the adjacent pixels (not used as representation of the length of two or more sections).

Steps S101 to S103 correspond to the above-described magnification acquisition means, and the CPU 17 for executing steps S101 to S103 corresponds to the above-described magnification acquisition section.

After calculating the inverse conversion magnifications ((Ih/Oh)×256 and (Iv/Ov)×265) described above (S103), the CPU 17 reserves a storage area to store one of pieces into which the image data of the original image is divided every predetermined size (which will be hereinafter referred to as divided original image data) in the DRAM 15 (S104) and inputs the divided original image data into the storage area (S105).

Subsequently, the CPU 17 reserves a storage area to store image data created as described later based on the divided original image data input into the storage area in the DRAM 15 (which will be hereinafter referred to as divided output image data) (S106).

Then, the CPU 17 executes pixel interpolation processing described later for the divided original image data input into the DRAM 15 (S107).

Upon completion of execution of the pixel interpolation processing, the CPU 17 executes processing of outputting the completed divided output image data to the video controller 191 (S108) and determines whether or not another divided original image data exists (S109). If another divided original image data exists (NO at S109), again the CPU 17 reserves a storage area of the divided original image data (S104), inputs the divided original image data (S105), reserves a storage area of divided output image data (S106), and executes pixel interpolation processing described later for the divided original image data (S107). As the processing is repeated, if divided original image data to be processed runs out (YES at S109), then the CPU 17 terminates the processing in FIG. 2.

Step S108 corresponds to the above-described image data output means, and the CPU 17 for executing step S108 corresponds to the above-described image data output section.

Next, the pixel interpolation processing will be discussed. FIGS. 3 to 8 are flowcharts to show a flow of the pixel interpolation processing.

Figure 3:
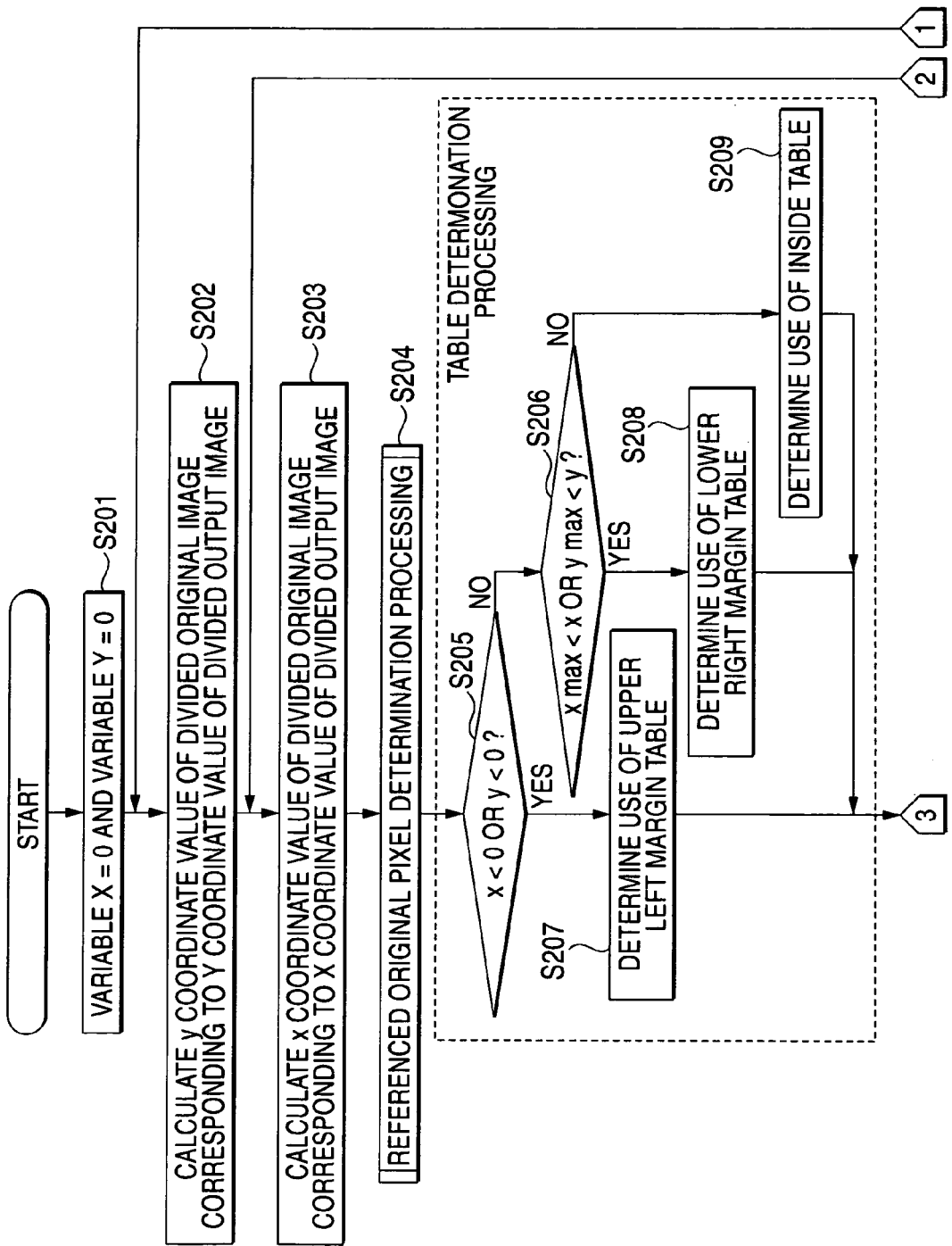
FIG. 3 is a flowchart of pixel interpolation processing.

First, the CPU 17 assigns zero to a variable X and assigns zero to a variable Y (S201) as shown in FIG. 3.

Subsequently, the CPU 17 calculates the y coordinate value in the divided original image corresponding to the Y coordinate value in the divided output image (S202). Specifically, the CPU 17 multiplies the coordinate value Y by the lateral inverse conversion magnification ((Ih/Oh)×256) and subtracts 128 from the multiplication result to find the y coordinate value.

The value 128 is a value provided by multiplying 256 by 0.5, namely, indicates a half of one section between the adjacent original pixels (half pixel). That is, as 128 is subtracted from the coordinate value after inverse conversion, the coordinates of the original pixel referenced about the output image coordinates (X, Y) are shifted to the negative side (left) by a half pixel.

Figure 9A:
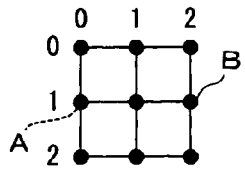
FIG. 9 is a schematic representation of the reason why the coordinates of each interpolation point on an original image are found according to inverse conversion magnification and then shifted by a half pixel.
Figure 9B:
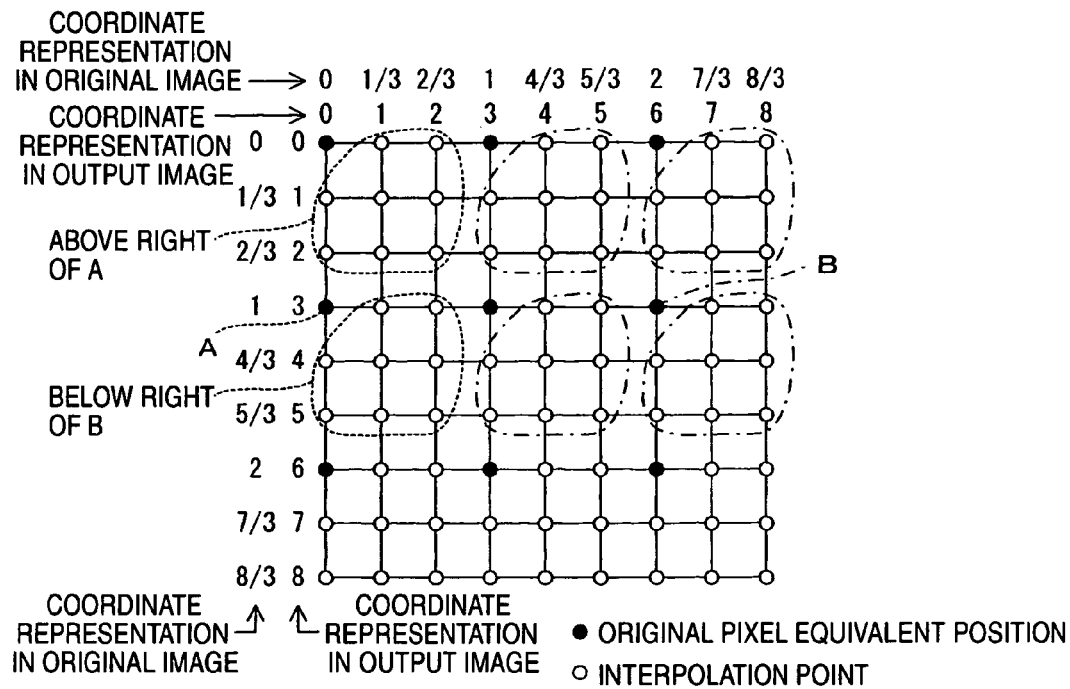
Figure 9C:
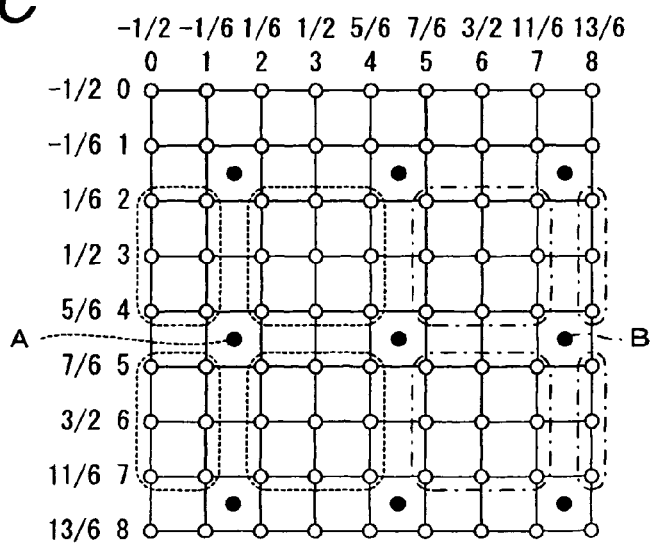

The reason why the coordinates of the original pixel are shifted to the negative side by a half pixel is as follows: Here, for easy understanding, description is given in a state in which the coordinate value of the original image is not multiplied by 256. For example, assuming that the original image is made up of 3×3 pixels as shown in FIG. 9A, it is defined that when the original image is enlarged longitudinally three times and laterally three times, the coordinates in the original image corresponding to the output image coordinates (0, 0) are (0, 0) as shown in FIG. 9B (placement of a black circle in the coordinates (0, 0) in FIG. 9B means the definition). In this case, attention is focused on pixel A of coordinates (0, 1) of the original image and pixel B of coordinates (2, 1). As each interpolation point indicated by a white circle in FIG. 9B, the value provided by multiplying the pixel value of the original pixel by weight inversely proportional to the distance from the original pixel (black circle) on the original image is acquired as a part of the pixel value of the interpolation point in the bilinear interpolation. Therefore, conversely, for example, as for the pixel B, the pixel value of the pixel B is distributed to the interpolation points in the areas above and below the right of the pixel B and above and below the left of the pixel B (in FIG. 9B, the interpolation points surrounded by the alternate long and short dashed line). On the other hand, as for the pixel A, the pixel value of the pixel A is distributed only to the interpolation points in the areas above and below the right of the pixel A (in FIG. 9B, the interpolation points surrounded by the dashed line). That is, the pixel A uses only the half of the pixel value of the pixel A for accumulation of the pixel values of the interpolation points. Thus, in the embodiment, as shown in FIG. 9C, the coordinates of the original image corresponding to the output image coordinates (X, Y) are shifted to the negative side (left and upper side) by a half pixel, whereby the upper left and lower left areas including the interpolation points to which the pixel value is to be distributed are also given to the pixel A. Consequently, the coordinates of the original image corresponding to the output image coordinates (0, 0) become (−0.5, −0.5) and each interpolation point on the output image does not always have the corresponding coordinates on the coordinates with both x and y coordinate values in the original image being integers.

Subsequently, the CPU 17 calculates the x coordinate value in the divided original image corresponding to the X coordinate value in the divided output image (S203). Specifically, the CPU 17 multiplies the coordinate value X by the longitudinal inverse conversion magnification ((Iv/Ov)×256) and subtracts 128 from the multiplication result to find the x coordinate value.

Steps S202 and S203 correspond to the above-described interpolation point definition means, and the CPU 17 for executing steps S202 and S203 corresponds to the above-described interpolation point definition section.

Figure 10:
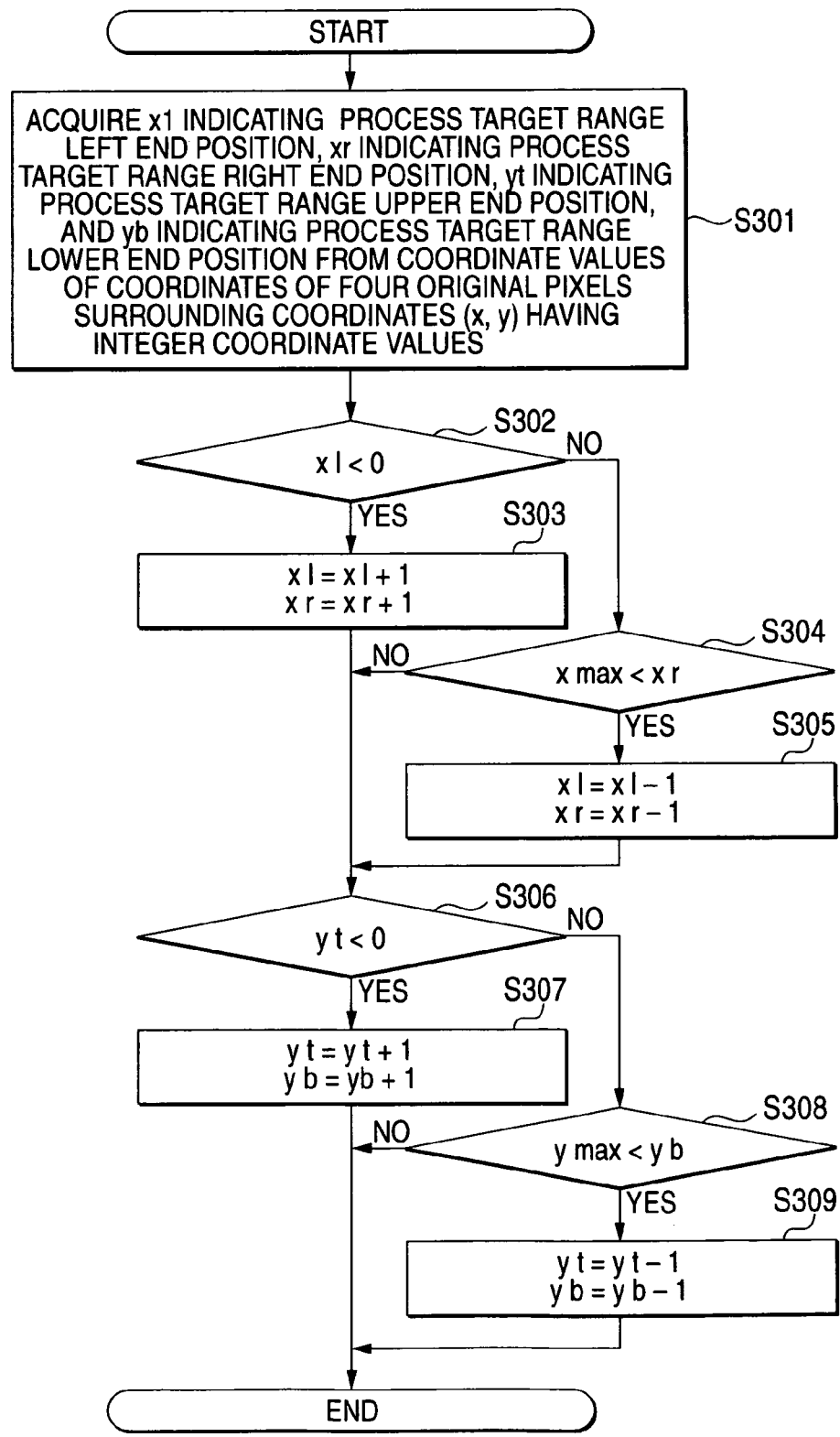
FIG. 10 is a flowchart to show a flow of referenced original pixel determination processing.

Subsequently, the CPU 17 executes a subroutine for determining the coordinates of the original image to be referenced in calculating the pixel value of the coordinates (x, y) corresponding to the coordinates in the original image (X, Y) according to the bilinear interpolation (S204). FIG. 10 is a flowchart to show a flow of the subroutine.

After starting the subroutine, the CPU 17 determines the coordinates of four pixels surrounding the coordinates (x, y) among the coordinates having integer (containing negative) coordinate values on the original image. Then, the CPU 17 assigns the x coordinate values of the coordinates of the determined coordinates of four pixels above and below the left of the coordinates (x, y) to a variable xl indicating the process target range left end position, assigns the x coordinate values of the coordinates above and below the right of the coordinates (x, y) to a variable xr indicating the process target range right end position, assigns the y coordinate values of the coordinates above the left and the right of the coordinates (x, y) to a variable yt indicating the process target range upper end position, and assigns the y coordinate values of the coordinates below the left and the right of the coordinates (x, y) to a variable yb indicating the process target range lower end position (S301).

Subsequently, the CPU 17 determines whether or not the variable xl indicating the process target range left end position is smaller than 0 (S302). If the variable xl is smaller than 0 (YES at S302), the CPU 17 increments the assignment value to the variable xl indicating the process target range left end position and the assignment value to the variable xr indicating the process target range right end position by one (S303). On the other hand, if the variable xl is equal to or larger than 0 (NO at S302), the CPU 17 determines whether or not the variable xr indicating the process target range right end position is larger than maximum value xmax in the x direction of the divided original image (S304). If the variable xr indicating the process target range right end position is larger than the maximum value xmax (YES at S304), the CPU 17 decrements the assignment value to the variable xl indicating the process target range left end position and the assignment value to the variable xr indicating the process target range right end position by one (S305); if the variable xr indicating the process target range right end position is equal to or smaller than the maximum value xmax (NO at S304), the CPU 17 does not change the assignment value to the variable xl indicating the process target range left end position and the assignment value to the variable xr indicating the process target range right end position.

Subsequently, the CPU 17 determines whether or not the variable yt indicating the process target range upper end position is smaller than 0 (S306). If the variable yt is smaller than 0 (YES at S306), the CPU 17 increments the assignment value to the variable yt indicating the process target range upper end position and the assignment value to the variable yb indicating the process target range lower end position by one (S307). On the other hand, if the variable yt is equal to or larger than 0 (NO at S306), the CPU 17 determines whether or not the variable yb indicating the process target range lower end position is larger than maximum value ymax in the y direction of the divided original image (S308). If the variable yb indicating the process target range lower end position is larger than the maximum value ymax (YES at S308), the CPU 17 decrements the assignment value to the variable yt indicating the process target range upper end position and the assignment value to the variable yb indicating the process target range lower end position by one (S309); if the variable yb indicating the process target range lower end position is equal to or smaller than the maximum value ymax (NO at S308), the CPU 17 does not change the assignment value to the variable yt indicating the process target range upper end position and the assignment value to the variable yb indicating the process target range lower end position.

The CPU determines the assignment values to the variables xl, xr, yt, and yb as described above and exits the processing in FIG. 10. The referenced original pixel determination subroutine shown in FIG. 10 corresponds to the above-described inverse distance generation means, and the CPU 17 for executing the subroutine corresponds to the above-described inverse distance generation section.

After completion of the processing in FIG. 10, the CPU 17 performs table determination processing for determining which of three tables recorded in the ROM 16 is to be used for the subsequent processing (S205 to S209) as shown in FIG. 3.

Each of the three tables recorded in the ROM 16 is a table used when the distance value provided by subtracting the xl coordinate value from the x coordinate value (the distance value equals 256 minus the distance value provided by subtracting the xr coordinate value from the x coordinate value (inverse distance value)) and the distance value provided by subtracting the yt coordinate value from the y coordinate value (the distance value equals 256 minus the distance value provided by subtracting the yb coordinate value, from the y coordinate value (inverse distance value)) is replaced with another value. The three tables are each used properly in response to the position difference of the coordinates (x, y) in the original image as described later.

Specifically, the CPU 17 first determines whether or not either of the x coordinate value and the y coordinate value is a value smaller than 0 (S205).

If either of the x coordinate value and the y coordinate value is smaller than 0 (YES at S205), the CPU 17 determines that an upper left margin table used for the interpolation point in the left margin or the upper margin of the original image among the three tables recorded in the ROM 16 is to be used for distance value determination processing described later (S207). The left margin of the original image refers to the area falling below the minimum value 0 in the x direction of the original image; in the example in FIG. 9C, it is the area containing coordinates (0, 0) to coordinates (0, 8) and coordinates (1, 0) to coordinates (1, 8). The upper margin of the original image refers to the area falling below the minimum value 0 in the y direction of the original image; in the example in FIG. 9C, it is the area containing coordinates (0, 0) to coordinates (8, 0) and coordinates (0, 1) to coordinates (8, 1).

On the other hand, if both of the x coordinate value and the y coordinate value are equal to or larger than 0 (NO at S205), the CPU 17 determines whether or not the x coordinate value is larger than xmax or the y coordinate value is larger than the ymax (S206).

If the x coordinate value is larger than xmax or the y coordinate value is larger than the ymax (YES at S206), the CPU 17 determines that a lower right margin table used for the interpolation point in the right margin or the lower margin of the original image among the three tables recorded in the ROM 16 is to be used for distance value determination processing described later (S208). The right margin of the original image refers to the area above the maximum value xmax in the x direction of the original image; in the example in FIG. 9C, it is the area containing coordinates (8, 2) to coordinates (8, 8). The lower margin of the original image refers to the area above the maximum value ymax in the y direction of the original image; in the example in FIG. 9C, it is the area containing coordinates (2, 8) to coordinates (8, 8).

On the other hand, if the x coordinate value is equal to or smaller than xmax and the y coordinate value is equal to or smaller the ymax (NO at S206), the CPU 17 determines that an inside table used for the interpolation point inside the original image among the three tables recorded in the ROM 16 is to be used for distance value determination processing described later (S209). The inside of the original image refers to the area in the range from the minimum value 0 to the maximum value xmax in the x direction of the original image and in the range from the minimum value 0 to the maximum value ymax in the y direction of the original image. In the example in FIG. 9C, it is the area containing coordinates (2, 2) to coordinates (7, 7).

Figure 4:
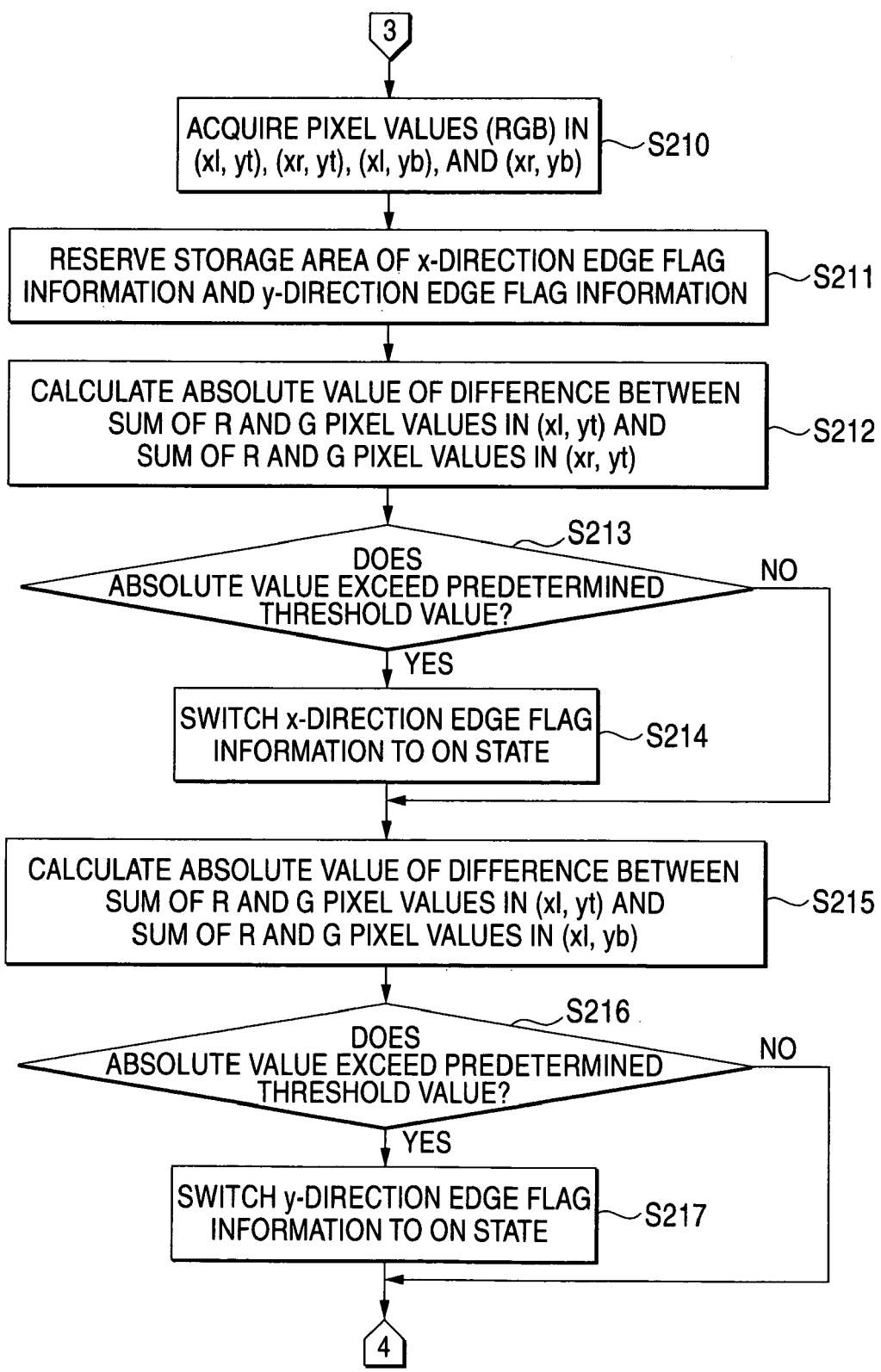
FIG. 4 is a flowchart of the pixel interpolation processing.

After thus determining the table used for the distance value determination processing described later, the CPU 17 reads the pixel values of RGB color components in the coordinates (xl, yt), (xr, yt), (xl, yb), and (xr, yb) from the storage area of the divided original pixel data (S210) as shown in FIG. 4.

Figure 11:
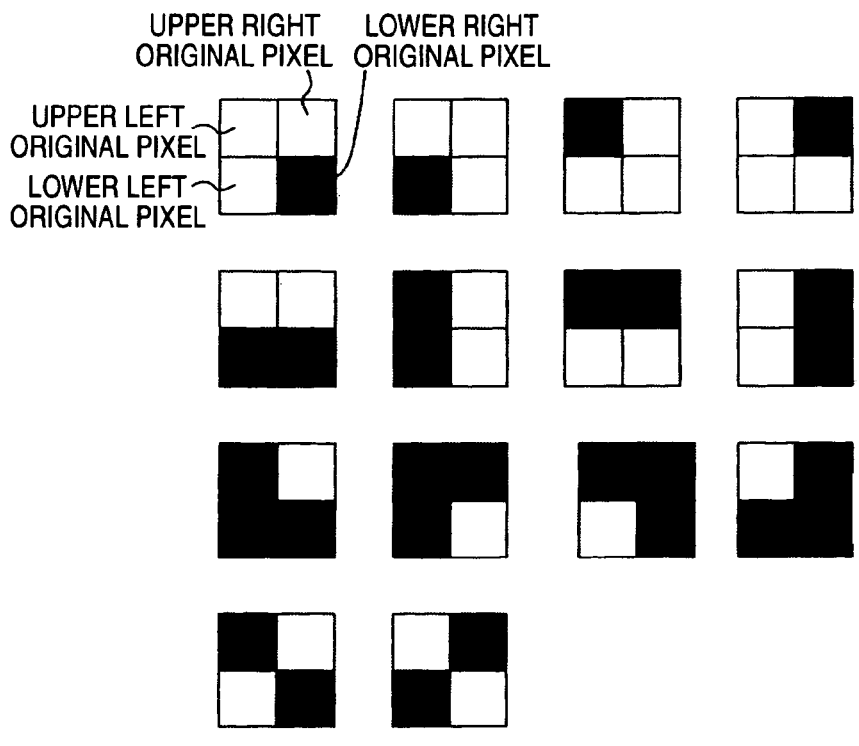
FIG. 11 is a drawing to show density difference patterns of four original pixels.

Subsequently, the CPU 17 records x-direction edge flag information and y-direction edge flag information in the DRAM 15 in off state (S211). The edge flag information is flag information for storing the determination result in the subsequent determination processing (S212 to S235). The determination processing is described later in detail; simply it refers to processing for determining whether or not the pixel value density difference in a minute image made up of four original pixels in the surroundings of the coordinates (x, y) is any of patterns as shown in FIG. 11.

After thus recording the edge information in the off state in the DRAM 15 (S211), the CPU 17 calculates the absolute value of the difference between the sum of the R pixel value and the G pixel value of the original pixel in the upper left coordinates (xl, yt) and the sum of the R pixel value and the G pixel value of the original pixel in the upper right coordinates (xr, yt) (S212).

Then, the CPU 17 determines whether or not the absolute value exceeds a predetermined threshold value (S213). If the absolute value exceeds the predetermined threshold value (YES at S213), the CPU 17 switches the x-direction edge flag information from the off state to the on state (S214); if the absolute value does not exceed the predetermined threshold value (NO at S213), the CPU 17 leaves the x-direction edge flag information in the off state.

Subsequently, the CPU 17 calculates the absolute value of the difference between the sum of the R pixel value and the G pixel value of the original pixel in the upper left coordinates (xl, yt) and the sum of the R pixel value and the G pixel value of the original pixel in the lower left coordinates (xl, yb) (S215).

Then, the CPU 17 determines whether or not the absolute value exceeds a predetermined threshold value (S216). If the absolute value exceeds the predetermined threshold value (YES at S216), the CPU 17 switches the y-direction edge flag information from the off state to the on state (S217); if the absolute value does not exceed the predetermined threshold value (NO at S216), the CPU 17 leaves the y-direction edge flag information in the off state.

Figure 5:
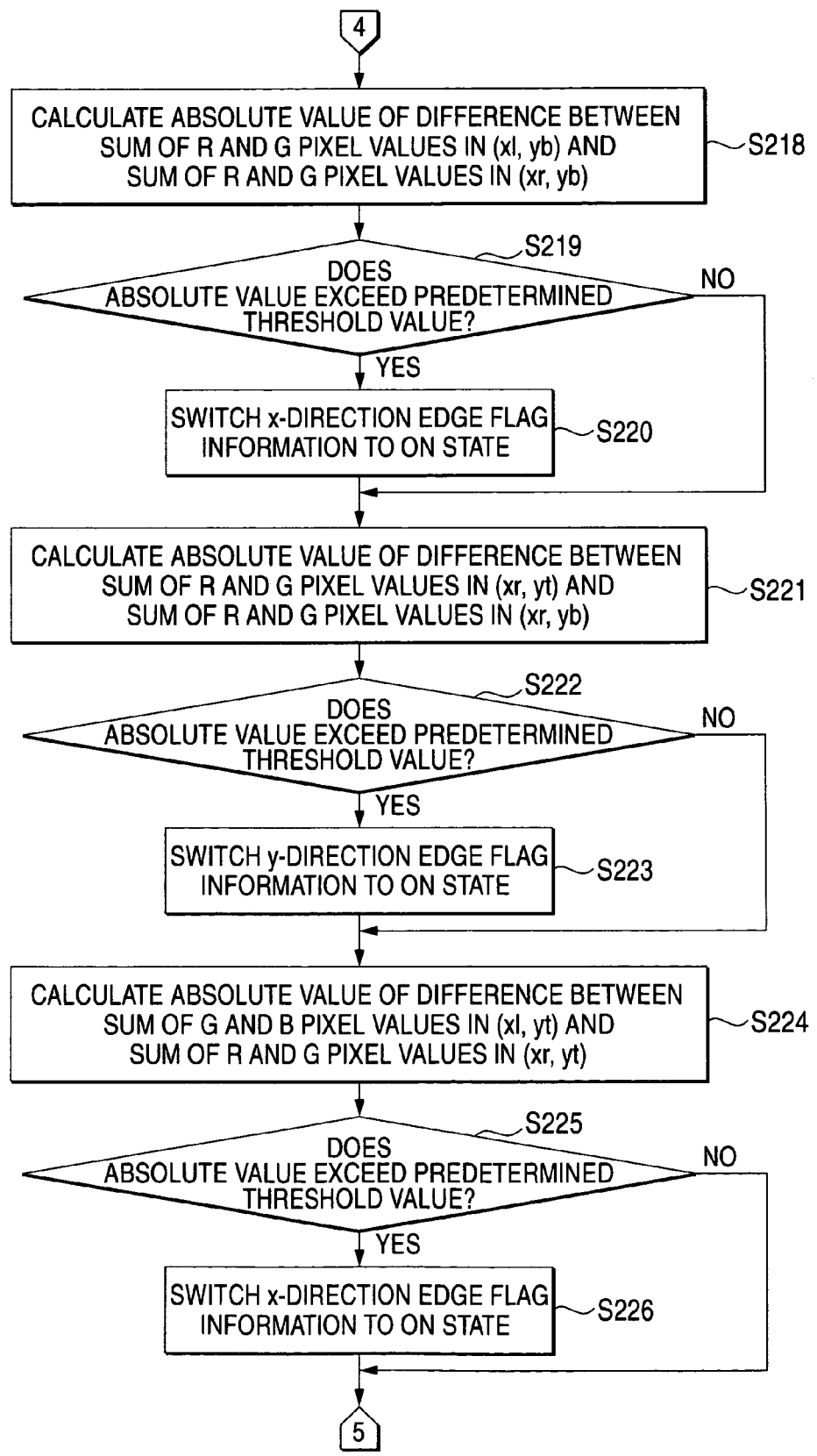
FIG. 5 is a flowchart of the pixel interpolation processing.

Subsequently, the CPU 17 calculates the absolute value of the difference between the sum of the R pixel value and the G pixel value of the original pixel in the lower left coordinates (xl, yb) and the sum of the R pixel value and the G pixel value of the original pixel in the lower right coordinates (xr, yb) (S218) as shown in FIG. 5.

Then, the CPU 17 determines whether or not the absolute value exceeds a predetermined threshold value (S219). If the absolute value exceeds the predetermined threshold value (YES at S219), the CPU 17 switches the x-direction edge flag information to the on state (S220); if the absolute value does not exceed the predetermined threshold value (NO at S219), the CPU 17 does not change the state of the x-direction edge flag information.

Subsequently, the CPU 17 calculates the absolute value of the difference between the sum of the R pixel value and the G pixel value of the original pixel in the upper right coordinates (xr, yt) and the sum of the R pixel value and the G pixel value of the original pixel in the lower right coordinates (xr, yb) (S221).

Then, the CPU 17 determines whether or not the absolute value exceeds a predetermined threshold value (S222). If the absolute value exceeds the predetermined threshold value (YES at S222), the CPU 17 switches the y-direction edge flag information to the on state (S223); if the absolute value does not exceed the predetermined threshold value (NO at S222), the CPU 17 does not change the state of the y-direction edge flag information.

Subsequently, the CPU 17 calculates the absolute value of the difference between the sum of the G pixel value and the B pixel value of the original pixel in the upper left coordinates (xl, yt) and the sum of the G pixel value and the B pixel value of the original pixel in the upper right coordinates (xr, yt) (S224).

Then, the CPU 17 determines whether or not the absolute value exceeds a predetermined threshold value (S225). If the absolute value exceeds the predetermined threshold value (YES at S225), the CPU 17 switches the x-direction edge flag information to the on state (S226); if the absolute value does not exceed the predetermined threshold value (NO at S222), the CPU 17 does not change the state of the x-direction edge flag information.

Figure 6:
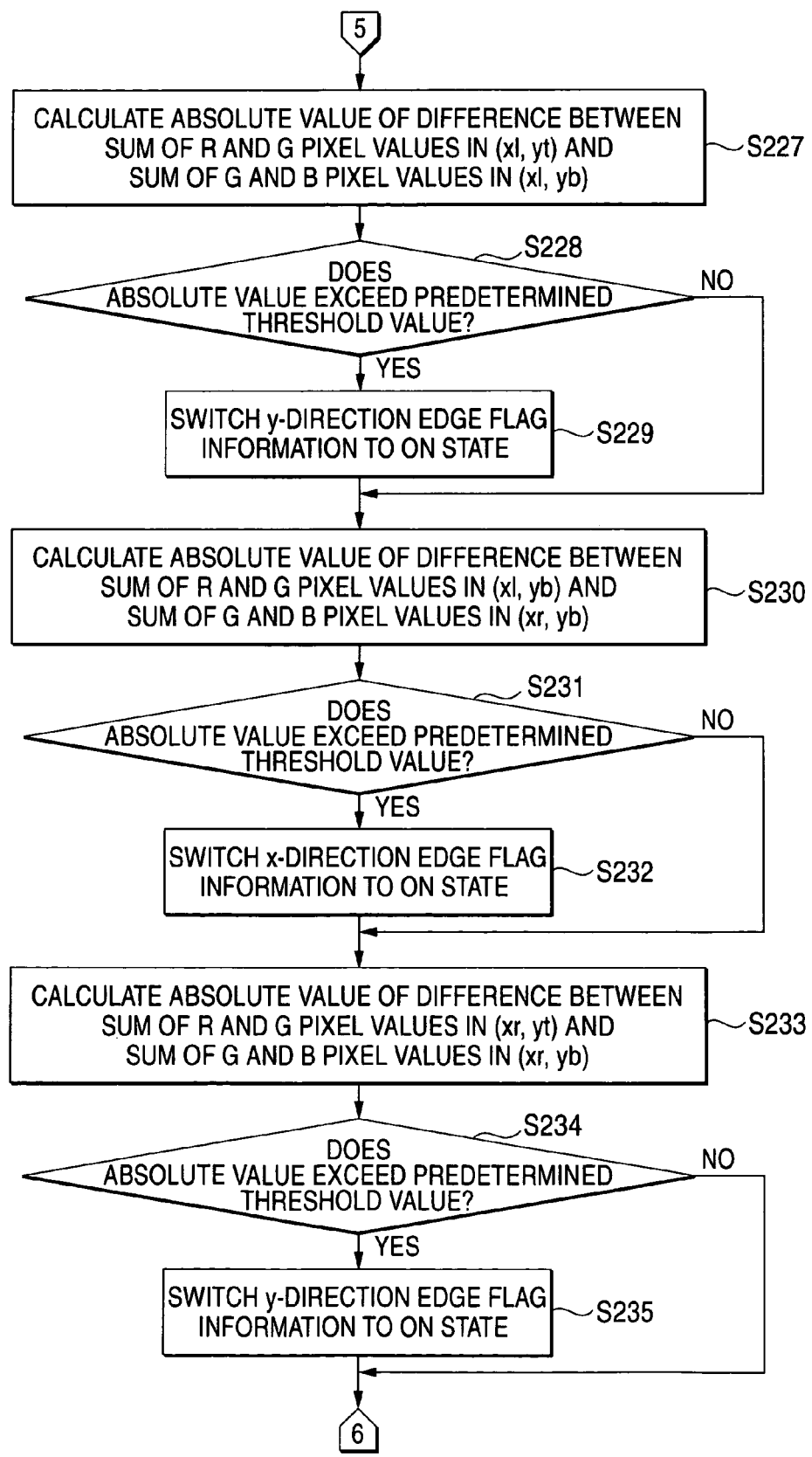
FIG. 6 is a flowchart of the pixel interpolation processing.

Subsequently, the CPU 17 calculates the absolute value of the difference between the sum of the G pixel value and the B pixel value of the original pixel in the upper left coordinates (xl, yt) and the sum of the G pixel value and the B pixel value of the original pixel in the lower left coordinates (xl, yb) (S227) as shown in FIG. 6.

Then, the CPU 17 determines whether or not the absolute value exceeds a predetermined threshold value (S228). If the absolute value exceeds the predetermined threshold value (YES at S228), the CPU 17 switches the y-direction edge flag information to the on state (S229); if the absolute value does not exceed the predetermined threshold value (NO at S228), the CPU 17 does not change the state of the y-direction edge flag information.

Subsequently, the CPU 17 calculates the absolute value of the difference between the sum of the G pixel value and the B pixel value of the original pixel in the lower left coordinates (xl, yb) and the sum of the G pixel value and the B pixel value of the original pixel in the lower right coordinates (xr, yb) (S230).

Then, the CPU 17 determines whether or not the absolute value exceeds a predetermined threshold value (S231). If the absolute value exceeds the predetermined threshold value (YES at S231), the CPU 17 switches the x-direction edge flag information to the on state (S232); if the absolute value does not exceed the predetermined threshold value (NO at S231), the CPU 17 does not change the state of the x-direction edge flag information.

Subsequently, the CPU 17 calculates the absolute value of the difference between the sum of the G pixel value and the B pixel value of the original pixel in the upper right coordinates (xr, yt) and the sum of the G pixel value and the B pixel value of the original pixel in the lower right coordinates (xr, yb) (S233).

Then, the CPU 17 determines whether or not the absolute value exceeds a predetermined threshold value (S234). If the absolute value exceeds the predetermined threshold value (YES at S234), the CPU 17 switches the y-direction edge flag information to the on state (S235); if the absolute value does not exceed the predetermined threshold value (NO at S234), the CPU 17 does not change the state of the y-direction edge flag information.

Figure 7:
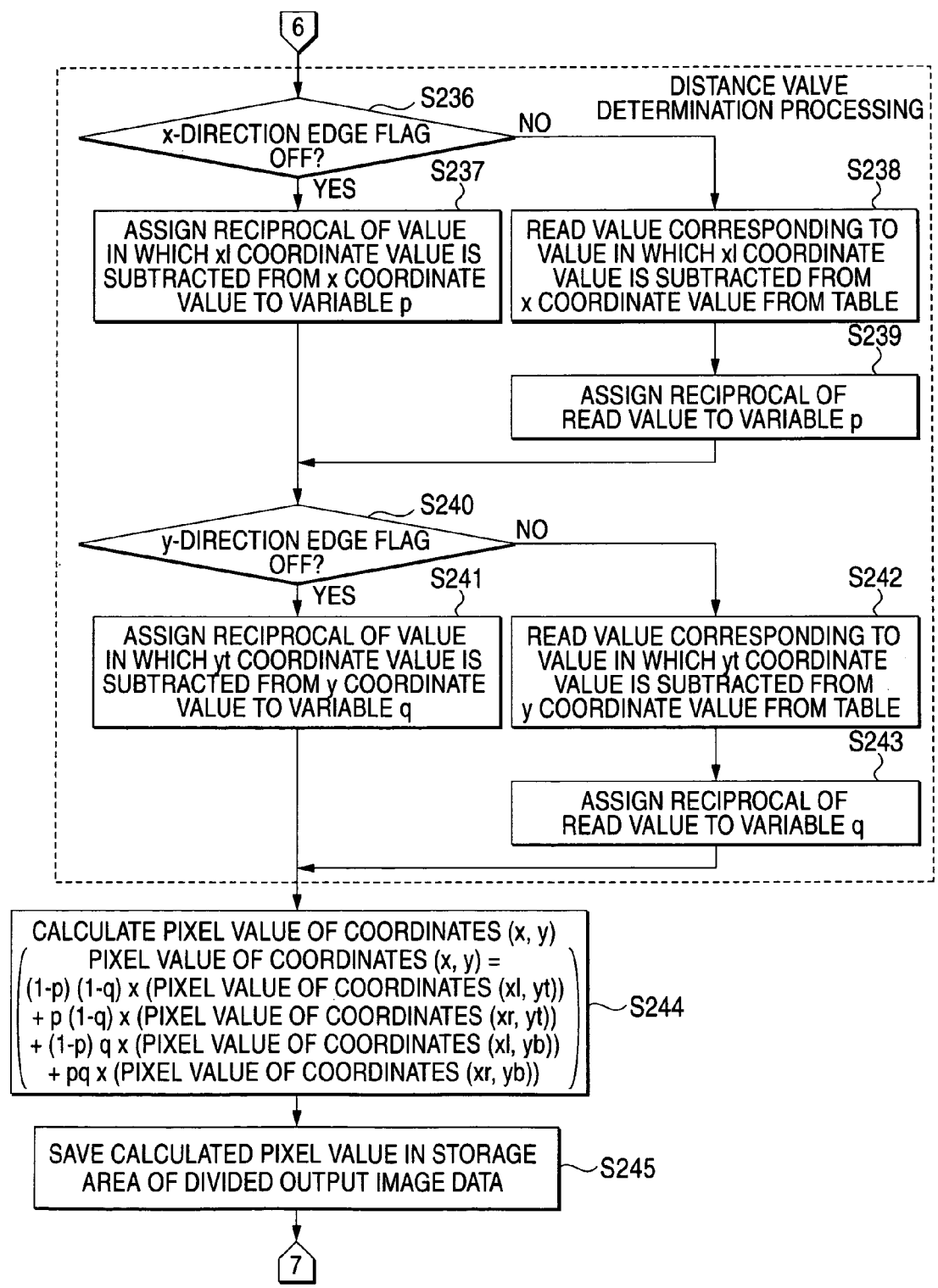
FIG. 7 is a flowchart of the pixel interpolation processing.

After completing the determination processing (S212 to S235) described above, the CPU 17 performs distance determination processing (S236 to S243) for determining the values of the distances from the coordinates (x, y) to the four original pixels in the surroundings of the coordinates (x, y) as shown in FIG. 7.

Specifically, the CPU 17 first determines whether the x-direction edge flag information is on or off state (S236).

If the x-direction edge flag information is off state (YES at S236), the CPU 17 assigns the value provided by subtracting the xl coordinate value from the x coordinate value and dividing the subtraction result by 256 to a variable p as the distance value (S237).

On the other hand, if the x-direction edge flag information is on state (NO at S236), the CPU 17 references the table of the three tables recorded in the ROM 16 determined to be used at the point in time (see steps S205 to S209), reads the value corresponding to the value provided by subtracting the xl coordinate value from the x coordinate value (S238), and assigns the value provided by dividing the read value by 256 to the variable p as the distance value (S239).

Subsequently, the CPU 17 determines whether the y-direction edge flag information is on or off state (S240).

If the y-direction edge flag information is off state (YES at S240), the CPU 17 assigns the value provided by subtracting the yt coordinate value from the y coordinate value and dividing the subtraction result by 256 to a variable q as the distance value (S241).

On the other hand, if the y-direction edge flag information is on state (NO at S240), the CPU 17 references the table of the three tables recorded in the ROM 16 determined to be used at the point in time (see steps S205 to S209), reads the value corresponding to the value provided by subtracting the yt coordinate value from the y coordinate value (S242), and assigns the value provided by dividing the read value by 256 to the variable q as the distance value (S243).

Steps S237 and S241 correspond to the above-described inverse distance value generation means and steps SS212 to S235, S238, S239, S242, and S243 correspond to the above-described inverse distance value correction means. The CPU 17 for executing steps S237 and S241 corresponds to the above-described inverse distance value generation section and the CPU 17 for executing steps SS212 to S235, S238, S239, S242, and S243 corresponds to the above-described inverse distance value correction section.

After thus determining the assignment values to the variables p and q, the CPU 17 uses the variables p and q to calculate the pixel value of the coordinates (x, y) for each of the R, G, and B components (S244). The calculation expression is the same as calculation expression used with general bilinear interpolation "pixel value of interpolation point=(1−p) (1−q)×(pixel value of upper left original pixel)+p (1−q)×(pixel value of upper right original pixel)+(1−p) q×(pixel value of lower left original pixel)+pq×(pixel value of lower right original pixel)."

The value of p is the inverse distance value in the x direction of the upper right original pixel and the lower right original pixel, and the value of (1−p) is the inverse distance value in the x direction of the upper left original pixel and the lower left original pixel. The value of q is the inverse distance value in the y direction of the lower left original pixel and the lower right original pixel, and the value of (1−q) is the inverse distance value in the y direction of the upper left original pixel and the upper right original pixel.

The CPU 17 saves the calculated RGB pixel value in the position of the coordinates (x, y) in the area reserved in the DRAM 15 as the storage area of the divided output image data (S245).

Steps S244 and S245 correspond to the above-described pixel value generation means, and the CPU 17 for executing steps S244 and S245 corresponds to the above-described pixel value generation section.

Figure 8:
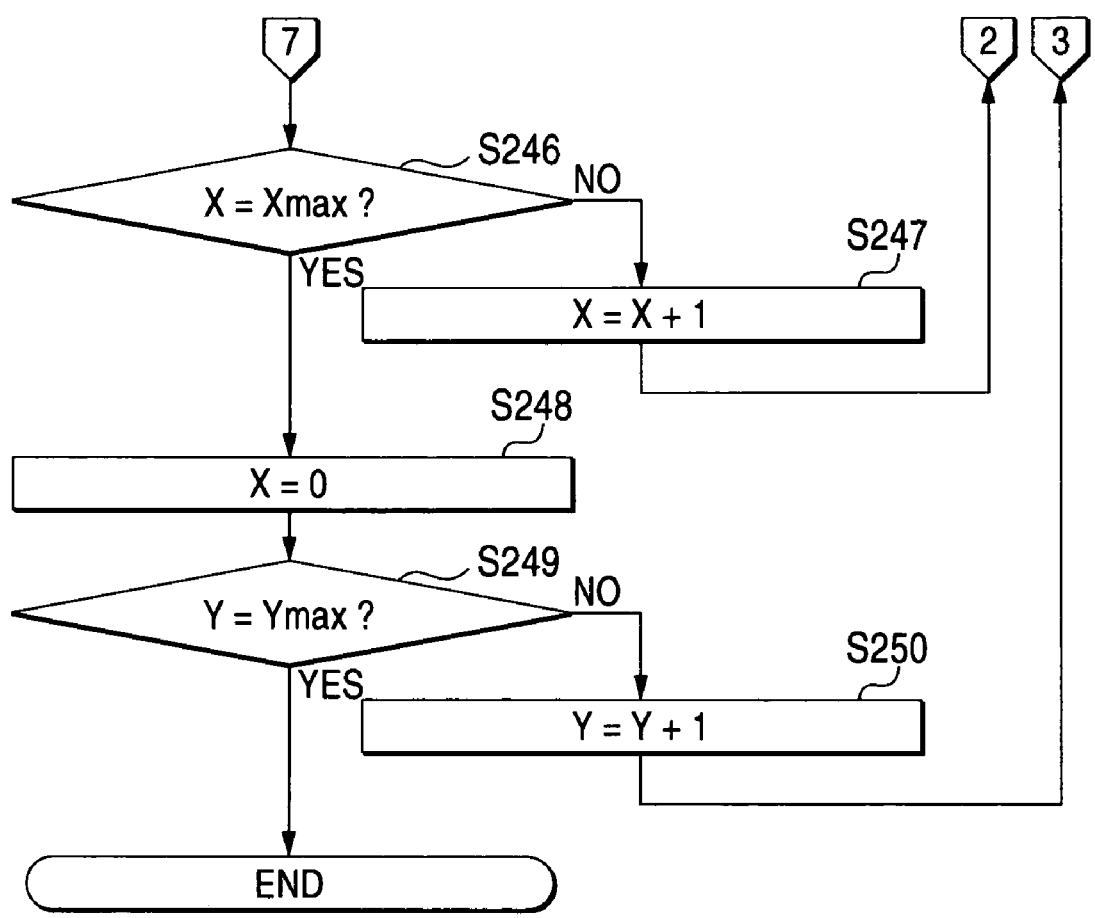
FIG. 8 is a flowchart of the pixel interpolation processing.

Then, the CPU 17 determines whether or not the variable X reaches the maximum value Xmax in the X direction of the divided output image (S246) as shown in FIG. 8. At this time, if the variable X does not reach the maximum value Xmax (NO at S246), the CPU 17 increments the assignment value to the variable X by one (S247) and again executes the processing at steps S203 to S245.

As the processing at steps S203 to S247 is repeated, when the variable X reaches the maximum value Xmax (YES at S246), the CPU 17 assigns 0 to the variable X (S248) and determines whether or not the variable Y reaches the maximum value Ymax in the Y direction of the divided output image (S249). At this time, if the variable Y does not reach the maximum value Ymax (NO at S249), the CPU 17 increments the assignment value to the variable Y by one (S250) and again executes the processing at steps S202 to S248.

As the processing at steps S202 to S250 is repeated, when the variable Y reaches the maximum value Ymax (YES at S249), the CPU 17 terminates the processing in FIGS. 3 to 8.

The printer 10 of the embodiment is configured so as to perform the processing as described above and therefore has the following advantages:

As described above, in the printer 10 of the embodiment, when the divided original image data is input to the DRAM 15, the pixel values of the pixels of the divided output image are generated in sequence based on the pixel values of the pixels of the divided original image (S201 to S250).

At this time, if the divided original image contains a portion with moderate change in light and shade like a landscape, the portion does not include any boundary portion where light and shade change sharply and therefore the printer 10 determines that for every interpolation point in the portion, there is no density difference of the four pixels referenced to create the pixel value of the interpolation point (NO at S213, NO at S216, NO at S219, NO at S222, NO at S225, NO at S228, NO at S231, and NO at S234). Thus, in this case, both the x-direction edge flag information and the y-direction edge flag information remain off and thus the inverse distance value inversely proportional to the distance is used for the weight by which the pixel values of the four original pixels are multiplied to create the pixel value of one interpolation point as with the general bilinear interpolation (S237, S241).

On the other hand, if the divided original image contains a portion like a check pattern or a solid image like a cartoon, the portion includes a boundary portion where light and shade change sharply and therefore the printer 10 determines that for any interpolation point in the portion, there is a density difference of the four pixels referenced to create the pixel value of the interpolation point (YES at S213, YES at S216, YES at S219, YES at S222, YES at S225, YES at S228, YES at S231, or YES at S234). Thus, in this case, either or both the x-direction edge flag information and the y-direction edge flag information are set to on for the interpolation point thus determined and thus the corrected inverse distance value rather than the inverse distance value inversely proportional to the distance as in the general bilinear interpolation is used for the weight by which the pixel values of the four original pixels are multiplied to create the pixel value of the interpolation point (S238, S239, S242, S243).

Figure 12:
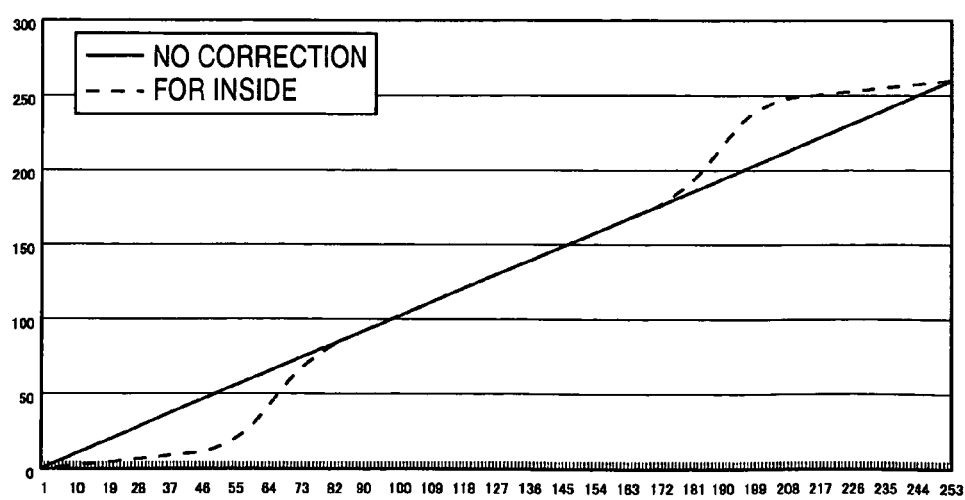
FIG. 12 is a graph wherein the values of an inside table used for correcting the distance value for one interpolation point inside the original image are plotted on coordinates.
Figure 13:
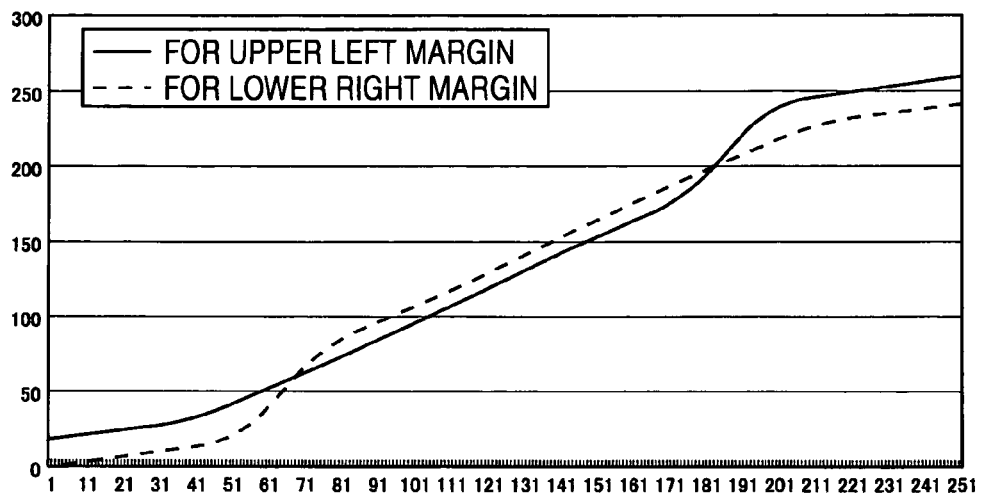
FIG. 13 is a graph wherein the values of an upper left margin table and a lower right margin table used for correcting the distance value for interpolation points in the upper left margin and lower right margin of the original image are plotted on coordinates.

FIGS. 12 and 13 are graphs with table values used for correction of the inverse distance value plotted on coordinates. In each of the graphs, the horizontal axis indicates the pre-corrected inverse distance values and the vertical axis indicates the post-corrected inverse distance values.

The dashed line graph in FIG. 12 indicates the relationship between the pre-corrected and post-corrected inverse distance values when a correction is made to an interpolation point inside the original image. According to the inside table indicated by the dashed line in FIG. 12, when the value of the distance between the original pixel and the interpolation point is below about 80, the inverse distance value is corrected so as to become a smaller inverse distance value; when the inverse distance value is above about 175, the inverse distance value is corrected so as to become a larger inverse distance value. The solid line graph in FIG. 12 indicates the relationship between the inverse distance values when a correction using the table is not made for comparison (the relationship between the pre-corrected and post-corrected inverse distance values assuming that correction procedure is executed).

Figure 14:
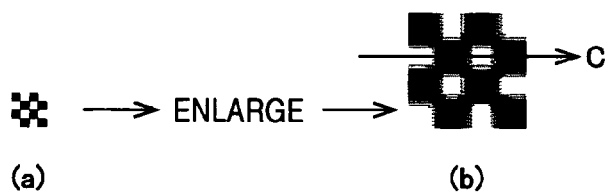
FIG. 14 is a drawing to show a state before and a state after an image of a check pattern is enlarged using the printer of the embodiment of the invention.
Figure 16:
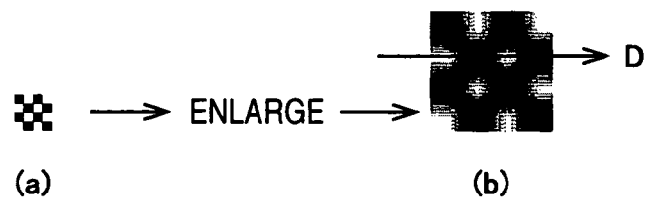
FIG. 16 is a drawing to show Estate before and a state after a check pattern image is enlarged using general bilinear interpolation.

If the inverse distance value to calculate weight applied to the pixel value of the original pixel is thus corrected for an interpolation point inside the original image, the boundary portion (edge) where light and shade change sharply in the post-enlarged image does not become so dim. For example, assuming that a check pattern as shown in FIG. 14(a) exists inside the original image, if the original image is enlarged in the printer 10 of the embodiment, the post-enlarged image becomes an image as shown in FIG. 14(b). As is evident from a comparison between the image in FIG. 14(b) and an enlarged image in FIG. 16(b) indicating the resultant image enlarged according to the general bilinear interpolation, the boundary between white and black squares is slightly enhanced in the enlarged image in FIG. 14(b).

Figure 15:
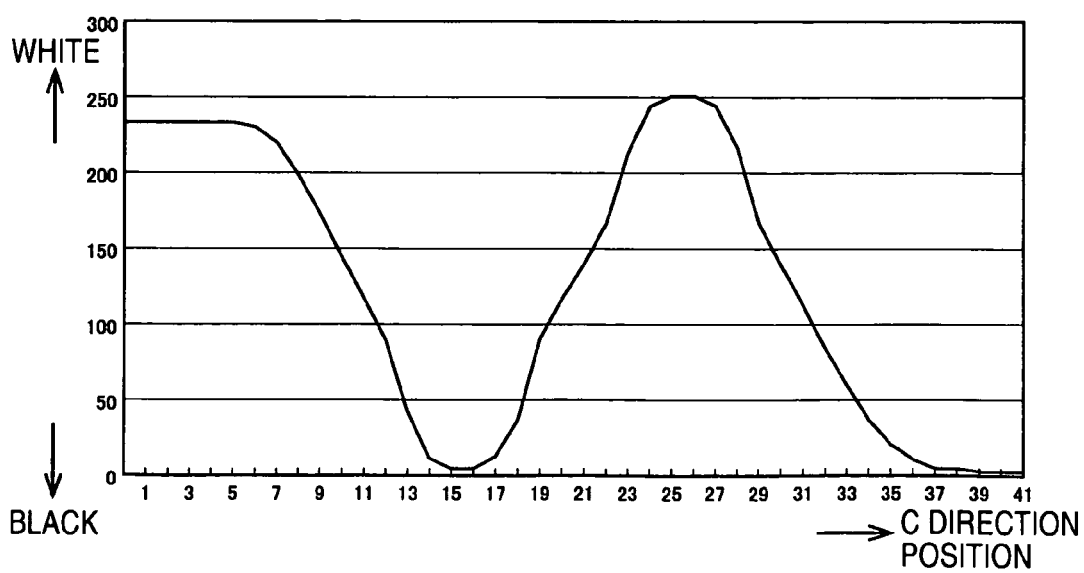
FIG. 15 is a graph of a pixel value distribution on a line C of an enlarged check pattern image.
Figure 17:
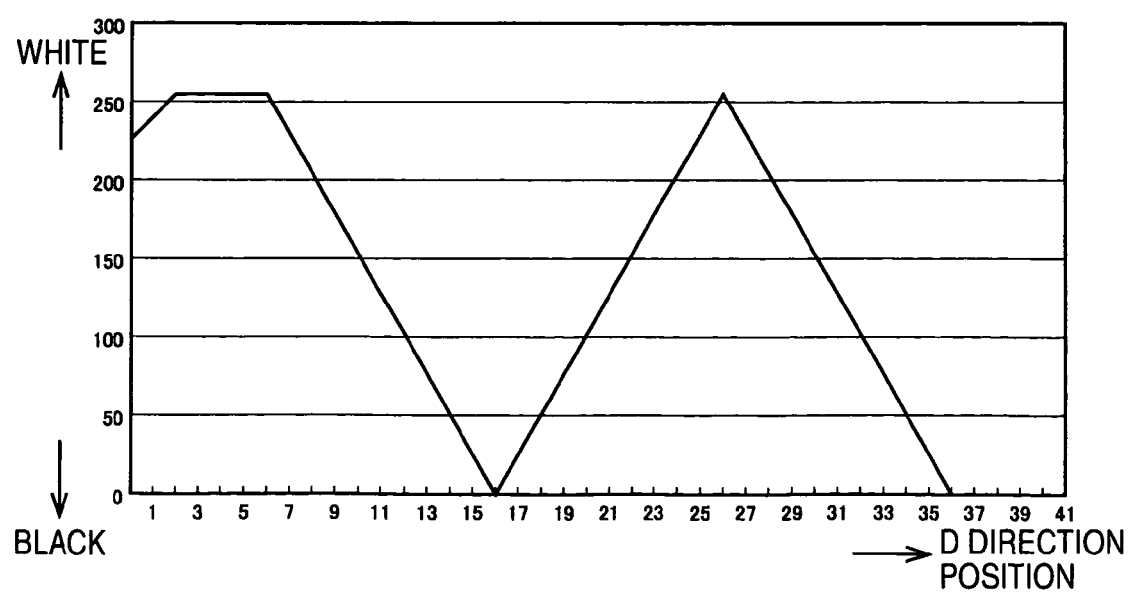
FIG. 17 is a graph of a pixel value distribution on a D line of the check pattern image enlarged using the general bilinear interpolation.

FIG. 15 is a graph to show a pixel value distribution on a C line of the enlarged image in FIG. 14B. As is evident from a comparison between the pixel value distribution shown in FIG. 15 and a pixel value distribution shown in FIG. 17 as a pixel value distribution on a line D of the enlarged image according to the general bilinear interpolation in FIG. 16, the pixel values of pixels in the boundary between white and black squares and in the proximity thereof distribute like a sine curve according to the printer 10 of the embodiment. It is also evident from the graph that the degree of dimness appearing in the boundary between white and black squares is decreased.

The solid line graph in FIG. 13 indicates the relationship between the pre-corrected and post-corrected inverse distance values when a correction is made to an interpolation in the left margin or the upper margin of the original image. According to the upper left margin table indicated as the solid line graph in FIG. 13, when the inverse distance value between the original pixel and the interpolation point is below about 50, the inverse distance value is corrected so as to become a larger inverse distance value; when the inverse distance value is above about 175, the inverse distance value is also corrected so as to become a larger inverse distance value.

The dashed line graph in FIG. 13 indicates the relationship between the pre-corrected and post-corrected inverse distance values when a correction is made to an interpolation in the right margin or the lower margin of the original image. According to the lower right margin table indicated as the solid line graph in FIG. 13, when the inverse distance value between the original pixel and the interpolation point is below about 80, the inverse distance value is corrected so as to become a smaller inverse distance value; when the inverse distance value is above about 210, the inverse distance value is also corrected so as to become a smaller inverse distance value.

Figure 18A:
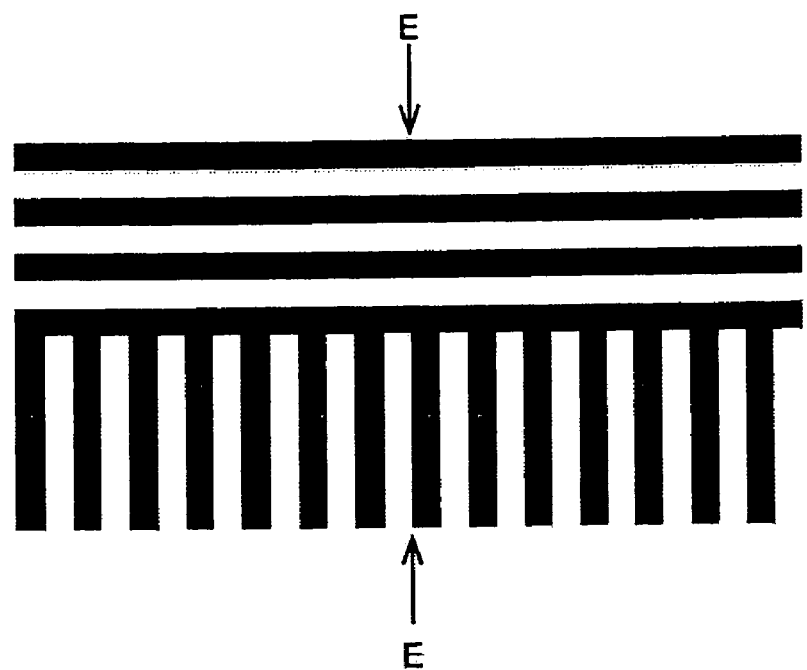
FIG. 18 is a drawing to show a state before and a state after an image made up of a lateral-striped pattern and a vertical-striped pattern is enlarged using the printer of the embodiment of the invention.
Figure 18B:
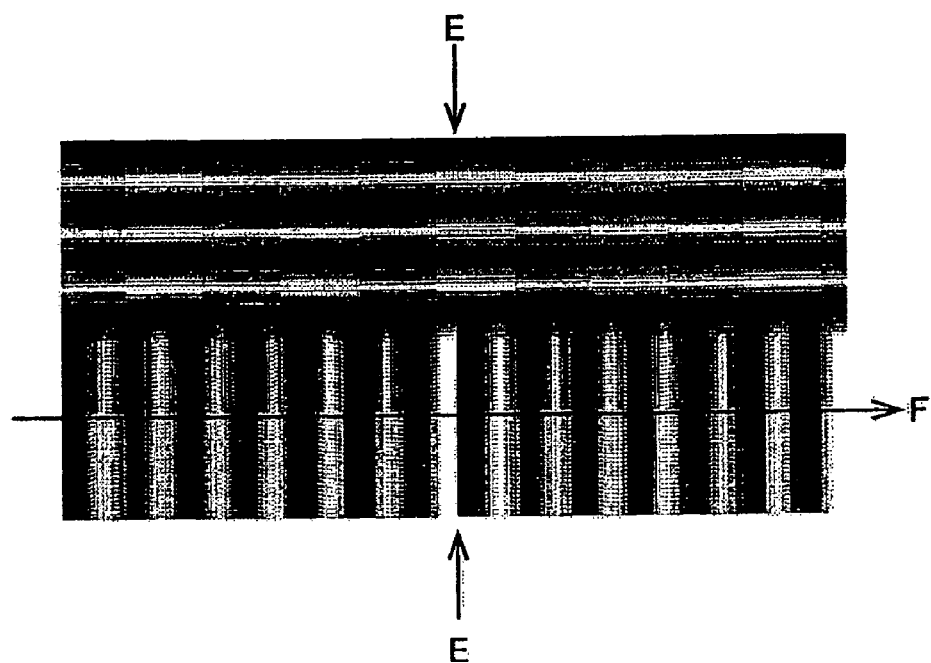
Figure 19A:
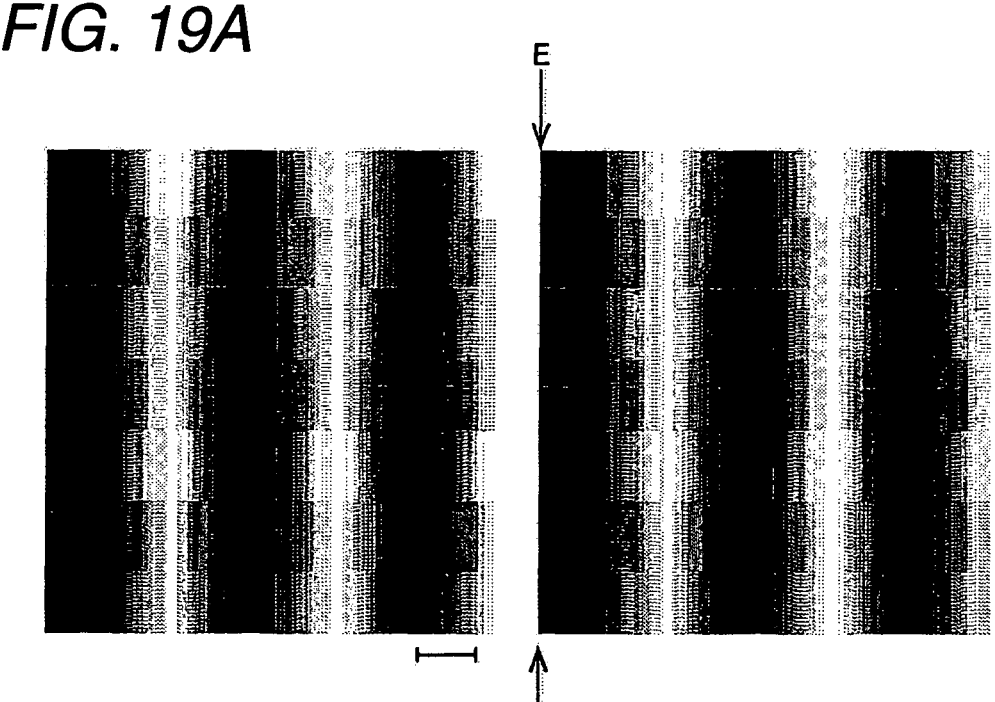
FIG. 19 is enlarged views of the boundary portion between white and black stripes on a line E-E when the general bilinear interpolation is used and that when the printer of the embodiment of the invention is used.
Figure 19B:
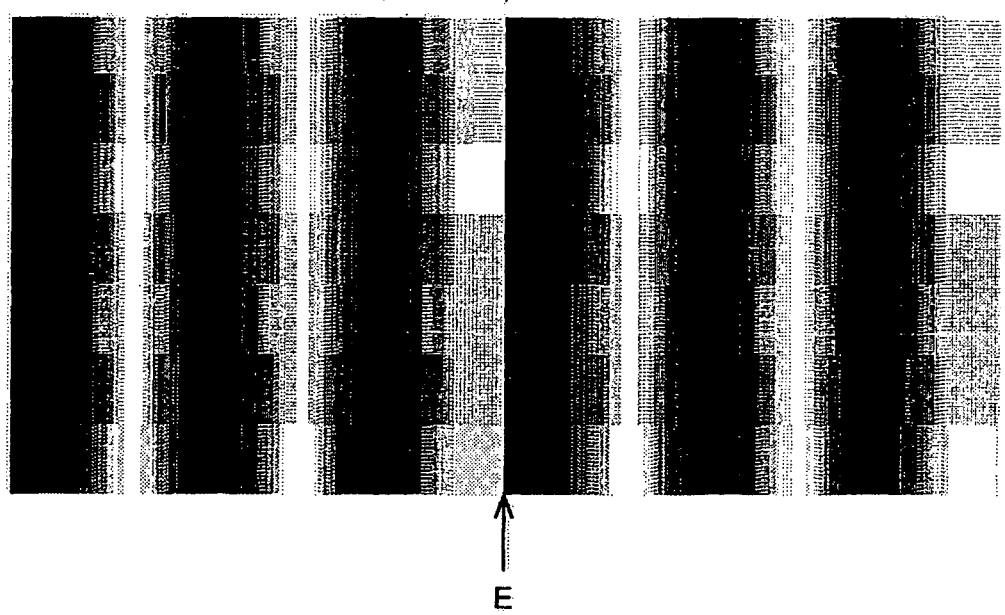

When the inverse distance value to calculate weight applied to the pixel value of the original pixel is thus corrected for the interpolation points in the left and right margins and the upper and lower margins of the original image, if an image containing a picture with sharp change in light and shade is divided in the light and shade boundary portion and the divided images are separately enlarged and then are joined, the image joints become inconspicuous in the final enlarged image. For example, if an original image made up of a lateral-striped pattern and a vertical-striped pattern is divided along a line E-E (vertical line) as shown in FIG. 18A and the divided images are separately enlarged according to the general bilinear interpolation and then are joined, the boundary between the white and black stripes on the line E-E in the vertical-striped pattern in the post-joined enlarged image has light and shade change different from light and shade change in any other boundary and joints are conspicuous as shown in FIG. 18B and FIG. 19A of an enlarged view of FIG. 18B. However, in an enlarged image provided as the printer 10 of the embodiment performs similar processing (division, separate enlargement, join) for the same original image, the gray area of the white stripe to the left of the line E-E spreads and the darkness of black of the black stripe to the right of the line E-E is slightly pale as shown in FIG. 19B.

Figure 20:
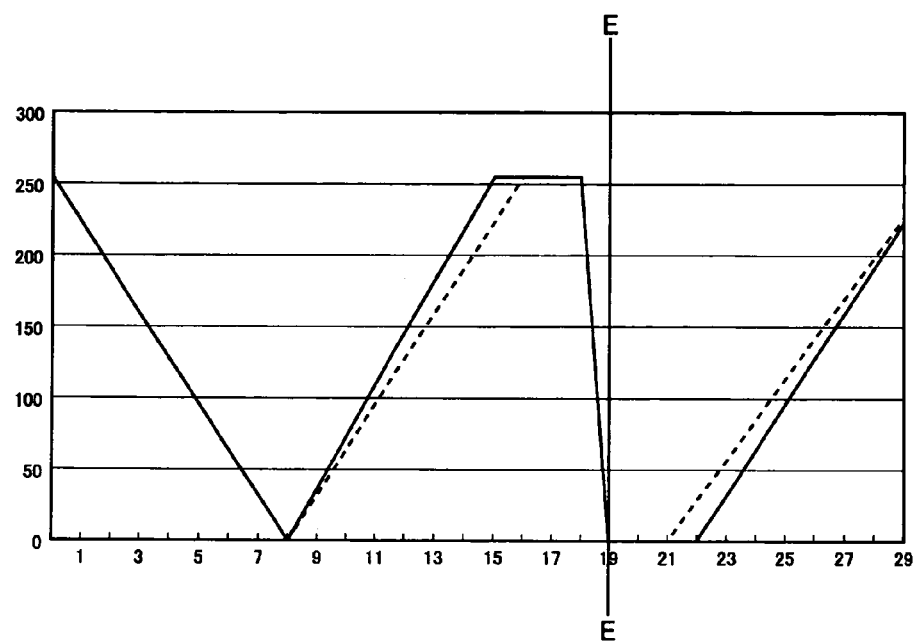
FIG. 20 is a graph of a pixel value distribution on a line F of an enlarged image made up of a lateral-striped pattern and a vertical-striped pattern.
Figure 21:
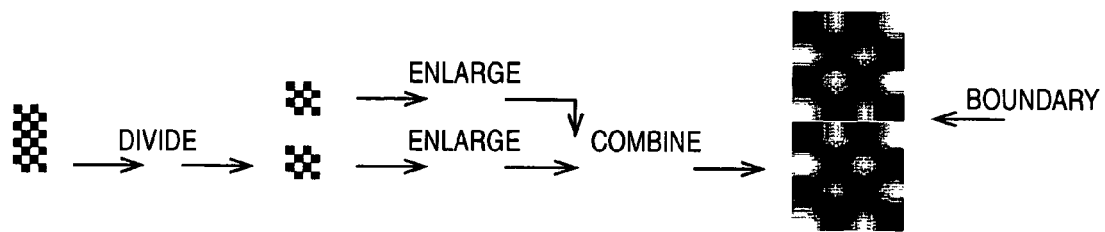
FIG. 21 is a drawing to show a state in which the check pattern image is divided and the divided image are enlarged individually, and then combining the enlarged check patter images.

FIG. 20 is a graph to show a pixel value distribution on a line F of the enlarged image shown in FIG. 18B. FIG. 20 shows a solid line graph and a dashed line graph; the solid line graph shows the pixel value distribution of the enlarged image provided according to the general bilinear interpolation (namely, the enlarged image in FIG. 19A) and the dashed line graph shows the pixel value distribution of the enlarged image provided in the printer 10 of the embodiment (namely, the enlarged image in FIG. 19B). As shown in FIG. 20, according to the printer 10 of the embodiment, when a white stripe exists in the right margin of the original image, the lightness of the white stripe is decreased and when a black stripe exists in the left margin of the original image, the darkness of the black stripe is decreased. In contrast, although not shown, when a black stripe exists in the right margin of the original image, the darkness of the black stripe is decreased and when a white stripe exists in the left margin of the original image, the lightness of the white stripe is decreased. That is, using the upper left margin table and the lower right margin table, change in light and shade in the proximity of the division line in the images on both sides sandwiching the division line becomes moderate and the joint of the division line becomes inconspicuous.

The correction using the upper left margin table and the lower right margin table act so as to moderate change in light and shade in the joints; whereas, the correction using the inside table described above acts so as to make conspicuous change in light and shade. Therefore, the correction using the upper left margin table and the lower right margin table acts in an opposite manner to the correction using the inside table.

What is claimed is:

1. A pixel interpolation apparatus comprising:
an image data acquisition section that acquires image data of an original image including pixels arranged two-dimensionally as a process target;
a magnification acquisition section that acquires a magnification of the original image acquired by said image data acquisition section;
an interpolation point definition section that defines interpolation points between the original pixels of the original image in accordance with the magnification acquired by said magnification acquisition section;
an inverse distance value generation section that calculates, based on a distance in a longitudinal direction and a distance in a lateral direction of a rectangular area defined by four original pixels surrounding the interpolation point, an inverse distance value in the longitudinal direction and an inverse distance value in the lateral direction from the four original pixels to the interpolation point for each of all the interpolation points defined by said interpolation point definition section;
an inverse distance value correction section that: reads out, from a memory storing the inverse distance value and correction inverse distance value in association with each other, the correction inverse distance value corresponding to the inverse distance value calculated by said inverse distance value generation section for the interpolation point where pixel values of the four original pixels surrounding the interpolation point have a predetermined density difference of all the interpolation points; and replaces the inverse distance value with the correction inverse distance value;
a pixel value generation section that: calculates an inverse distance weighted average of the interpolation point based on the inverse distance value calculated by said inverse distance value generation section or the correction inverse distance value replaced by said inverse distance value correction section and the pixel values of the four original pixels surrounding the interpolation point, for each of all the interpolation points defined by said interpolation point definition section; and generates pixel values based on the inverse distance weighted average; and
an image data output section that outputs image data including the pixel values generated by said pixel value generation section as image data of an enlarged image,
wherein the memory associates a first inverse distance value with a correction inverse distance value larger than the first inverse distance value and associates a second inverse distance value with a correction inverse distance value smaller than the second inverse distance value, and
wherein the first inverse distance value is larger than the second inverse distance value.

2. The pixel interpolation apparatus as claimed in claim 1, wherein said inverse distance value correction section: replaces an inverse distance value in the longitudinal direction of an interpolation point where a predetermined density difference is involved in the longitudinal direction in a minute image including pixel values of four pixels surrounding the interpolation point, of all the interpolation points defined by said interpolation point definition section, with a correction inverse distance value; and replaces an inverse distance value in the lateral direction of an interpolation point where a predetermined density difference is involved in the lateral direction in a minute image including pixel values of four pixels surroundings the interpolation point with a correction inverse distance value.

3. A pixel interpolation apparatus comprising:
an image data acquisition section that acquires image data of an original image including pixels arranged two-dimensionally as a process target;
a magnification acquisition section that acquires a magnification of the original image acquired by said image data acquisition section;
an interpolation point definition section that defines interpolation points between the original pixels of the original image in accordance with the magnification acquired by said magnification acquisition section;

an inverse distance value generation section that calculates, based on a distance in a longitudinal direction and a distance in a lateral direction of a rectangular area defined by four original pixels surrounding the interpolation point, an inverse distance value in the longitudinal direction and an inverse distance value in the lateral direction from the four original pixels to the interpolation point for each of all the interpolation points defined by said interpolation point definition section;

an inverse distance value correction section that: reads out, from a memory storing the inverse distance value and correction inverse distance value in association with each other, the correction inverse distance value corresponding to the inverse distance value calculated by said inverse distance value generation section for the interpolation point where pixel values of the four original pixels surrounding the interpolation point have a predetermined density difference of all the interpolation points; and replaces the inverse distance value with the correction inverse distance value;

a pixel value generation section that: calculates an inverse distance weighted average of the interpolation point based on the inverse distance value calculated by said inverse distance value generation section or the correction inverse distance value replaced by said inverse distance value correction section and the pixel values of the four original pixels surrounding the interpolation point, for each of all the interpolation points defined by said interpolation point definition section; and generates pixel values based on the inverse distance weighted average; and an image data output section that outputs image data including the pixel values generated by said pixel value generation section as image data of an enlarged image, wherein the interpolation point where pixel values of the four original pixels surrounding the interpolation point involves a predetermined density difference is an interpolation point outside an area occupied by the original pixels of the original image, wherein said inverse distance value correction section reads out a correction inverse distance value corresponding to the inverse distance value for an interpolation point, which is positioned at the left of or above said area, the correction inverse distance value being read from a first memory for storing the inverse distance value and the correction inverse distance value in association with each other, and wherein said inverse distance value correction section reads out a correction inverse distance value corresponding to an inverse distance value for an interpolation point, which is positioned at the right of or below said area, from a second memory for storing the inverse distance value and the correction inverse distance value in association with each other, wherein the first memory associates a first inverse distance value with a correction inverse distance value larger than the first inverse distance value and associates a second inverse distance value with a correction inverse distance value larger than the second inverse distance value, and wherein the first inverse distance value is larger than the second inverse distance value.

4. The pixel interpolation apparatus as claimed in claim 3, wherein said pixel value generation section uses, for the interpolation point outside the area occupied by the original pixels of the original image, a pixel value of a first one of the original pixels that is near the interpolation point, and a pixel value of a second one of the original pixels that is near the first one of the original pixels, to calculate the inverse distance weighted average of the interpolation point.

5. The pixel interpolation apparatus as claimed in claim 3, wherein the first memory associates the largest inverse distance value with a correction inverse distance value of the same value as the largest inverse distance value and associates the smallest inverse distance value with a correction inverse distance value smaller than the smallest inverse distance value.

6. A pixel interpolation apparatus comprising:

an image data acquisition section that acquires image data of an original image including pixels arranged two-dimensionally as a process target;

a magnification acquisition section that acquires a magnification of the original image acquired by said image data acquisition section;

an interpolation point definition section that defines interpolation points between the original pixels of the original image in accordance with the magnification acquired by said magnification acquisition section;

an inverse distance value generation section that calculates, based on a distance in a longitudinal direction and a distance in a lateral direction of a rectangular area defined by four original pixels surrounding the interpolation point, an inverse distance value in the longitudinal direction and an inverse distance value in the lateral direction from the four original pixels to the interpolation point for each of all the interpolation points defined by said interpolation point definition section;

an inverse distance value correction section that: reads out, from a memory storing the inverse distance value and correction inverse distance value in association with each other, the correction inverse distance value corresponding to the inverse distance value calculated by said inverse distance value generation section for the interpolation point where pixel values of the four original pixels surrounding the interpolation point have a predetermined density difference of all the interpolation points; and replaces the inverse distance value with the correction inverse distance value;

a pixel value generation section that: calculates an inverse distance weighted average of the interpolation point based on the inverse distance value calculated by said inverse distance value generation section or the correction inverse distance value replaced by said inverse distance value correction section and the pixel values of the four original pixels surrounding the interpolation point, for each of all the interpolation points defined by said interpolation point definition section; and generates pixel values based on the inverse distance weighted average; and an image data output section that outputs image data including the pixel values generated by said pixel value generation section as image data of an enlarged image, wherein the interpolation point where pixel values of the four original pixels surrounding the interpolation point involves a predetermined density difference is an interpolation point outside an area occupied by the original pixels of the original image, wherein said inverse distance value correction section reads out a correction inverse distance value corresponding to the inverse distance value for an interpolation point, which is positioned at the left of or above said area, the correction inverse distance value being read from a first memory for storing the inverse distance value and the correction inverse distance value in association with each other, and wherein said inverse distance value correction section reads out a correction inverse distance value corresponding to an inverse distance value for an interpolation point, which is positioned at the right of or below said area, from a second memory for storing the inverse distance value and the correction inverse distance value in association with each other, wherein the second memory associates a first inverse distance value with a correction inverse distance value smaller than the first inverse distance value and associates a second inverse distance value with a correction inverse distance value smaller than the second inverse distance value, and wherein the first inverse distance value is larger than the second inverse distance value.

7. The pixel interpolation apparatus as claimed in claim 6, wherein the second memory associates the largest inverse distance value with a correction inverse distance value smaller than the largest inverse distance value and associates the smallest inverse distance value with a correction inverse distance value of the same value as the smallest inverse distance value.

8. The pixel interpolation apparatus as claimed in claim 6, wherein said pixel value generation section uses, for the interpolation point outside the area occupied by the original pixels of the original image, a pixel value of a first one of the original pixels that is near the interpolation point, and a pixel value of a second one of the original pixels that is near the first one of the original pixels, to calculate the inverse distance weighted average of the interpolation point.

* * * * *